United States Patent
Pascarella

(10) Patent No.: US 10,889,223 B2
(45) Date of Patent: Jan. 12, 2021

(54) RETROFITTABLE VEHICLE EXTENSION TABLE

(71) Applicant: Zachary D Pascarella, Buffalo, NY (US)

(72) Inventor: Zachary D Pascarella, Buffalo, NY (US)

( * ) Notice: Subject to any disclaimer, the term of this patent is extended or adjusted under 35 U.S.C. 154(b) by 0 days.

(21) Appl. No.: 16/199,026

(22) Filed: Nov. 23, 2018

(65) Prior Publication Data

US 2020/0164781 A1    May 28, 2020

(51) Int. Cl.
*B60N 3/00*    (2006.01)
*B60R 9/06*    (2006.01)
*B62D 33/027*    (2006.01)

(52) U.S. Cl.
CPC ............... *B60N 3/001* (2013.01); *B60R 9/06* (2013.01); *B62D 33/0273* (2013.01)

(58) Field of Classification Search
CPC .. B60N 3/001; B60R 5/04; B60R 9/06; B60P 3/14; B62D 33/023; B62D 33/027; B62D 33/0273
See application file for complete search history.

(56) References Cited

U.S. PATENT DOCUMENTS

| | | | | |
|---|---|---|---|---|
| 2,094,401 A * | 9/1937 | Girl | ............................ | B60R 5/04 414/462 |
| 3,375,959 A * | 4/1968 | Hamilton | ................ | B60R 9/045 224/484 |
| 3,628,578 A | 12/1971 | Berg | | |
| 3,726,422 A * | 4/1973 | Zelin | ......................... | B60R 5/04 414/522 |
| 4,531,773 A | 7/1985 | Smith | | |
| 4,887,526 A * | 12/1989 | Blatt | ...................... | B60N 3/001 108/44 |
| 5,372,397 A * | 12/1994 | Arndt | ...................... | B60R 13/01 296/39.2 |
| 5,478,130 A * | 12/1995 | Matulin | ............. | B62D 33/0273 296/51 |
| 5,820,190 A * | 10/1998 | Benner | ..................... | B60P 3/14 296/26.09 |

(Continued)

FOREIGN PATENT DOCUMENTS

DE    19619126 A1 *  11/1997  ............... B60R 5/04
DE  102010063819 A1 *   6/2012  ............ B60R 5/041

(Continued)

*Primary Examiner* — Hilary L Gutman
(74) *Attorney, Agent, or Firm* — Simpson & Simpson, PLLC

(57) ABSTRACT

A table for use with a vehicle tailgate, including a base member having a top surface and a bottom surface wherein the bottom surface of the base member is operatively arranged to be removably secured to the tailgate of a vehicle; a sliding mechanism having a sliding portion and a guide, wherein the guide is fixedly secured to the top surface of the base member; a center panel, wherein the bottom surface of the center panel is fixedly secured to the sliding portion of the sliding mechanism; left wing and right wing panels, wherein the proximal end of the right wing is pivotably secured to the right edge of the center panel, and wherein the proximal end of the left wing is pivotably secured to the left edge of the center panel; and, a fastener to removably secure the right wing panel and the left wing panel.

7 Claims, 28 Drawing Sheets

(56) References Cited

U.S. PATENT DOCUMENTS

| | | | | |
|---|---|---|---|---|
| 5,823,595 | A * | 10/1998 | Tronco | B60P 3/14 |
| | | | | 296/26.03 |
| 6,045,172 | A * | 4/2000 | Thomas | B62D 33/0273 |
| | | | | 108/44 |
| 6,193,294 | B1 * | 2/2001 | Disner | B62D 33/0273 |
| | | | | 108/44 |
| 6,364,391 | B1 | 4/2002 | Everett | |
| 6,422,627 | B1 * | 7/2002 | Kuhn | B60P 3/40 |
| | | | | 296/26.1 |
| 7,325,807 | B1 | 2/2008 | Eason | |
| 7,628,439 | B1 * | 12/2009 | Strong | B62D 33/0273 |
| | | | | 108/44 |
| 8,240,527 | B1 | 8/2012 | Casselton | |
| 8,662,501 | B1 | 3/2014 | Perales | |
| 9,302,717 | B1 | 4/2016 | Rude | |
| 9,387,806 | B2 | 7/2016 | Bzoza | |
| 9,834,260 | B2 | 12/2017 | Quick et al. | |
| 9,926,018 | B2 * | 3/2018 | Spahn | B62D 33/0273 |
| 9,956,924 | B2 | 5/2018 | Nania | |
| 9,956,996 | B2 | 5/2018 | Astrike | |
| 9,969,444 | B2 * | 5/2018 | Loew | B62D 33/0273 |
| 2006/0214449 | A1 * | 9/2006 | Klusmeier | B62D 33/0273 |
| | | | | 296/26.11 |
| 2008/0083352 | A1 * | 4/2008 | Tovani | A47B 83/04 |
| | | | | 108/44 |
| 2008/0185861 | A1 | 8/2008 | Johnson | |
| 2008/0231067 | A1 | 9/2008 | Nagle | |
| 2013/0094931 | A1 | 8/2013 | Bluhm | |
| 2014/0333083 | A1 | 11/2014 | Bzoza | |
| 2015/0225024 | A1 | 8/2015 | Newberry | |
| 2016/0144796 | A1 | 5/2016 | Bexar | |
| 2016/0214657 | A1 | 7/2016 | Topolovee et al. | |
| 2017/0158254 | A1 * | 6/2017 | Singer | B62D 21/14 |
| 2017/0282979 | A1 * | 10/2017 | Singer | B62D 33/0273 |
| 2018/0022280 | A1 * | 1/2018 | Ferreira Yanez | B60R 7/02 |
| | | | | 224/411 |
| 2018/0043842 | A1 * | 2/2018 | Nania | B60R 11/06 |
| 2019/0315285 | A1 * | 10/2019 | Steinhauser | B60R 11/00 |

FOREIGN PATENT DOCUMENTS

| | | | | |
|---|---|---|---|---|
| DE | 202017104091 | | 9/2017 | |
| DE | 202017104093 | | 9/2017 | |
| DE | 202017104724 | | 10/2017 | |
| DE | 202017105396 | | 11/2017 | |
| FR | 2438564 | A1 * | 5/1980 | B60R 5/04 |

\* cited by examiner

RETROFITTABLE VEHICLE EXTENSION TABLE

FIELD OF THE INVENTION

The invention relates generally to automotive accessories, and, more specifically, to a multi-purpose table operatively arranged to be fixedly secured to a vehicle tailgate.

BACKGROUND

A flat work surface is a desirable aspect to any mobile workspace for a number of reasons. For example, a flat surface is required for writing and drawing, and may additionally be useful as a base for assembling or fabricating apparatuses where access to a suitable workshop is limited. However, storing work surfaces such as tables, portable work benches, or other similar implements in a vehicle's cargo area reduces the quantity of space available with which to transport building materials or tools.

Pickup trucks are commonly used as mobile workshops due to their utility, convenience for moving and hauling objects, and wide-spread market availability when compared to other vehicles. Pickup trucks are additionally finding increased use in daily consumer life, including for leisure activities. A prototypical example of such use is "tailgating," wherein the truck bed and tailgate of a pickup truck are utilized by sporting event attendees as a platform upon which to host a party and serve refreshments. These tailgate-party attendees often need to bring portable folding tables in order to have a substantially flat surface on which to play games which require a tabletop, hold various food and beverages for the attendees' convenience, and hold various other party items like audio speakers, small grills or other cooking equipment, cooking implements, and personal items.

Despite their popularity, pickup trucks, as manufactured and marketed, lack a flat surface on which a user may write, draw, cut, or perform other tasks requiring a substantially flat surface. Aftermarket accessories for vehicle tailgates have become a popular way by which to overcome the absence of a substantially flat surface and augment the functionality of the vehicles used as mobile workshops or tailgate party locations. However, previously granted patents in the field of vehicle extension tables require replacement of the one or more components of the vehicle body to achieve table attachment. For example, U.S. Pat. No. 9,926,018 (Spahn et al.) discloses an invention that involves replacing factory vehicle components with components which have a recessed stowing area for the table surface and corresponding support posts. Similarly, U.S. Pat. No. 9,956,924 (Nania) discloses an invention that comprises a special storage pocket within the truck bed for stowing the contemplated retractable work table.

Thus, there has been a long-felt need for a vehicle extension table that can be easily attached to a vehicle tailgate, without the need to replace core components of the vehicle.

SUMMARY

The invention broadly comprises a table for use with a vehicle tailgate, comprising a base member having a top surface and a bottom surface wherein the bottom surface of the base member is operatively arranged to be removably secured to the tailgate of a vehicle, a sliding mechanism having a sliding portion and a guide, wherein the guide is fixedly secured to the top surface of the base member, a center panel having a top surface, a bottom surface, a right edge, and a left edge, wherein the bottom surface of the center panel is fixedly secured to the sliding portion of the sliding mechanism and operatively arranged to allow for translational movement of the center panel relative to the base member, a right wing panel having a top surface, a proximal end, and a distal end, wherein the proximal end of the right wing is pivotably secured to the right edge of the center panel such that the top surface of the right wing is substantially parallel to and resting atop the top surface of the center panel when in a closed configuration and is exposed and substantially parallel to the top surface of the center panel when in an open configuration, a left wing panel having a top surface, a proximal end, and a distal end, wherein the proximal end of the left wing is pivotably secured to the left edge of the center panel such that the top surface of the left wing rests on the top surface of the center panel when in a closed configuration and is exposed and parallel to the top surface of the center panel when in an open configuration, and, a fastener to removably secured the right wing panel and the left wing panel against the top surface of the center panel when in the closed configuration.

A primary object of the invention is to provide an extension table capable of attachment to a vehicle tailgate or other surface without requiring modification or replacement of the vehicle's existing components.

Another object of the invention is to provide workmen the ability to use a vehicle as a mobile workstation by attachment of a substantially flat table surface to the vehicle's tailgate.

Still a further object of the intention is to provide a substantially flat table which is attached to a vehicle tailgate to be used for the various activities customarily associated with hosting a tailgate party.

Yet another object of the invention is to provide a substantially flat surface extension for use with vehicles capable of expansion beyond the edges of the vehicle body and without interference from tailgate support cables.

These and other objects, features, and advantages of the present invention will become readily apparent upon a review of the following detailed description of the invention, in view of the drawings and appended claims.

BRIEF DESCRIPTION OF THE SEVERAL VIEWS OF THE DRAWINGS

Various embodiments are disclosed, by way of example only, with reference to the accompanying schematic drawings in which corresponding reference symbols indicate corresponding parts, in which:

FIG. 7 is an exploded view of the extension table of the present invention, shown above a vehicle tailgate to which it is arranged to be secured to;

DETAILED DESCRIPTION OF THE INVENTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics. It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Moreover, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Figure 1:
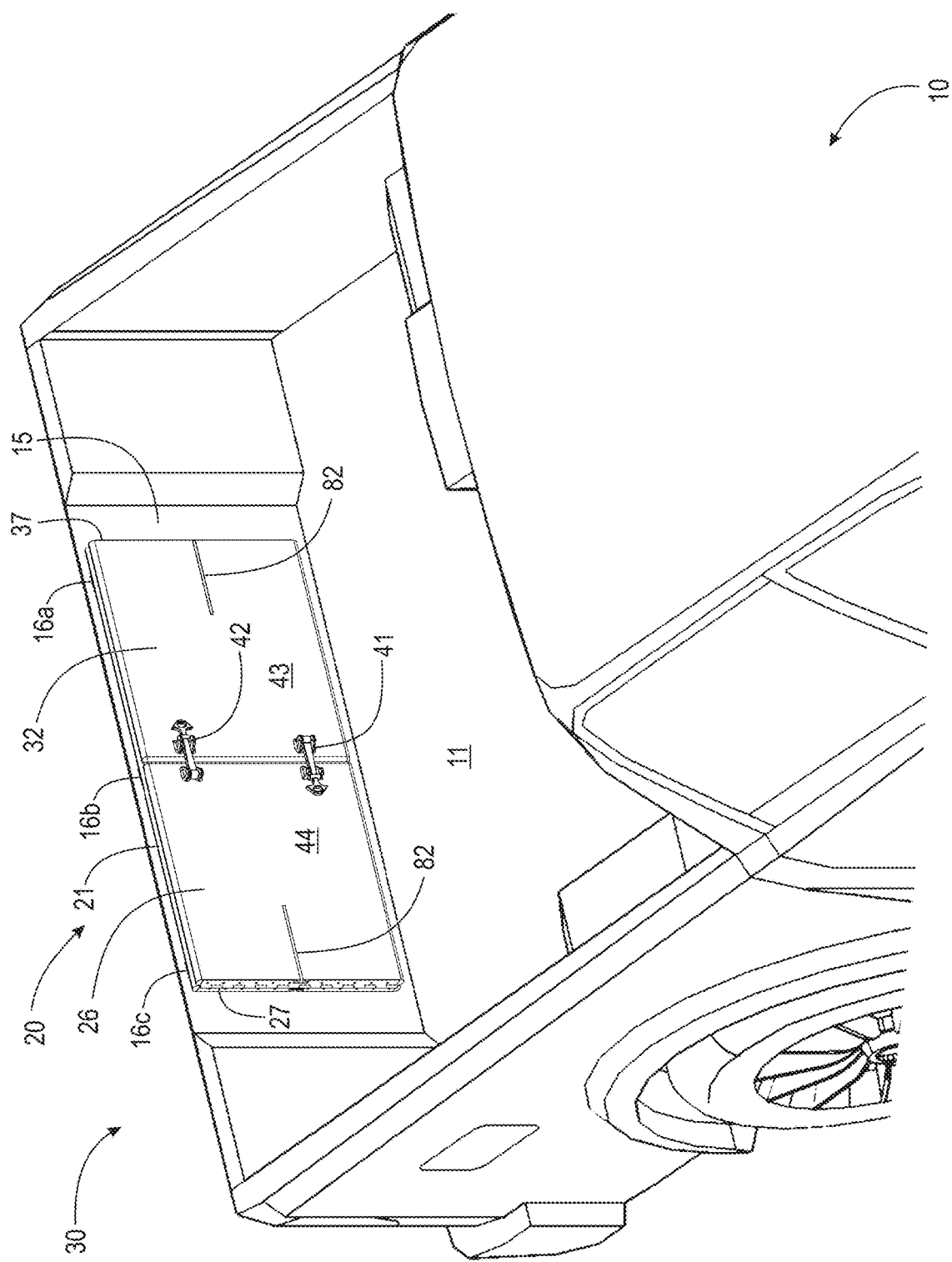
FIG. 1 is a fragmentary top perspective view of a pickup truck having a truck bed and tailgate with the extension table of the invention attached thereto, shown in a closed, retracted position with the tailgate closed.

Referring now to the figures, FIG. 1 is a fragmentary top perspective view of a vehicle 10 having a truck bed 11 and tailgate 15 with extension table 20 of the invention attached thereto, shown in a closed, retracted configuration. This drawing illustrates vehicle 10 having truck bed 11 and hingedly attached tailgate 15. Tailgate 15 is shown in a closed position, and affixed thereto is table assembly 30 arranged in a closed position, stowed within truck bed 11. The right wing panel 26 is shown in a closed configuration, with the top surface of the right wing panel 28 resting against and substantially parallel to the top surface of center panel 22. The left wing panel 32 is shown in a closed configuration, with the top surface of the left wing panel 33 resting against and substantially parallel to the top surface of center panel 22. In the preferred embodiment shown, the panels are shown secured in the closed configuration with a distal draw latch fastener 42 and a proximal draw latch fastener 41 (shown also in FIG. 2). The proximal draw latch fastener 41 comprises a draw arm 41a and a holding bracket 41b (partially shown in FIG. 4), wherein the proximal draw arm 41a is affixed to the bottom surface of the left wing panel 43 and is operatively arranged to engage with the proximal holding bracket 41b which is affixed to the bottom surface of the right wing panel 44. Likewise, the distal draw latch fastener 42 comprises a draw arm 42a and a holding bracket 42b (also partially shown in FIG. 4), wherein the distal draw arm 42a is affixed to the bottom surface of the right wing panel 44 and is operatively arranged to engage with the distal holding bracket 42b, which is affixed to the bottom surface of the left wing panel 43. Sliding mechanisms 16a, 16b, and 16c are secured to the top surface of the base member (as shown in FIG. 3) and to the bottom surface of center panel 22 and function to allow translational movement of the table outwardly and rearwardly from the tailgate, as will be described in more detail infra.

Figure 2:
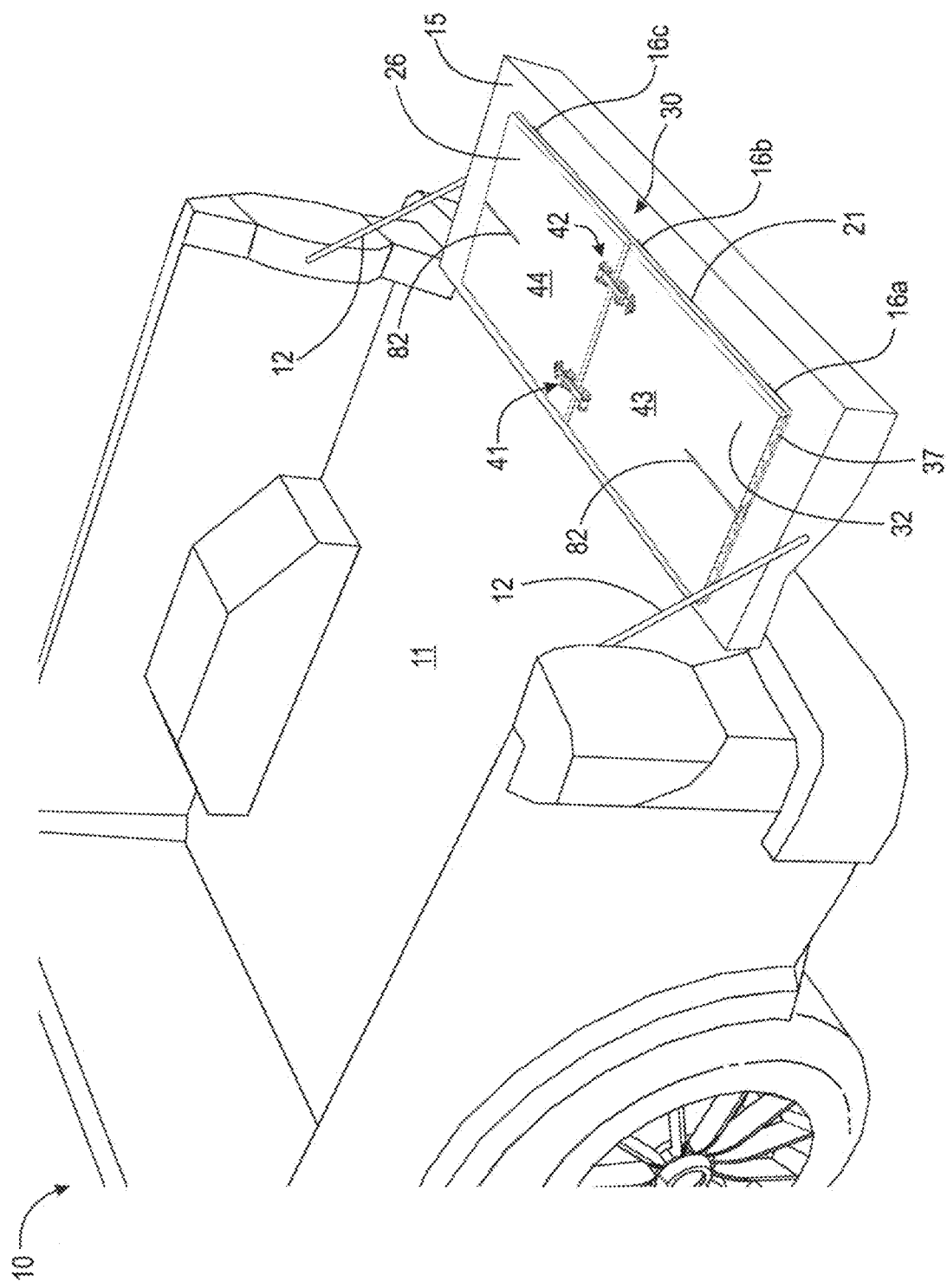
FIG. 2 is a view similar to that of FIG. 1 except with the tailgate open, but with the extension table still in a closed, retracted position.

FIG. 2 is a top fragmentary perspective view of vehicle 10 from FIG. 1, but illustrated to show the vehicle's tailgate 15 in an open configuration. The extension table assembly 30 is illustrated in a closed, retracted configuration. Support cables 12, extend from the frame of the truck to tailgate 15, at an angle substantially between 15° and 75° relative to the plane of tailgate 15 to provide structural support to tailgate 15 from truck bed 11, although any angle less than or equal to 90° relative to the tailgate is possible and contemplated. Extension table 20 broadly comprises base member 36 (shown in FIG. 3) and extension table assembly 30. Base member 36 is operatively arranged to be fixedly secured to tailgate 15. Extension table assembly 30 broadly comprises center panel 21, leftwing panel 32 and rightwing panel 26. Table assembly 30 is operatively arranged to slide inwardly and outwardly toward and away from truck bed 11 via slide mechanisms 16a, 16b and 16c.

Figure 3:
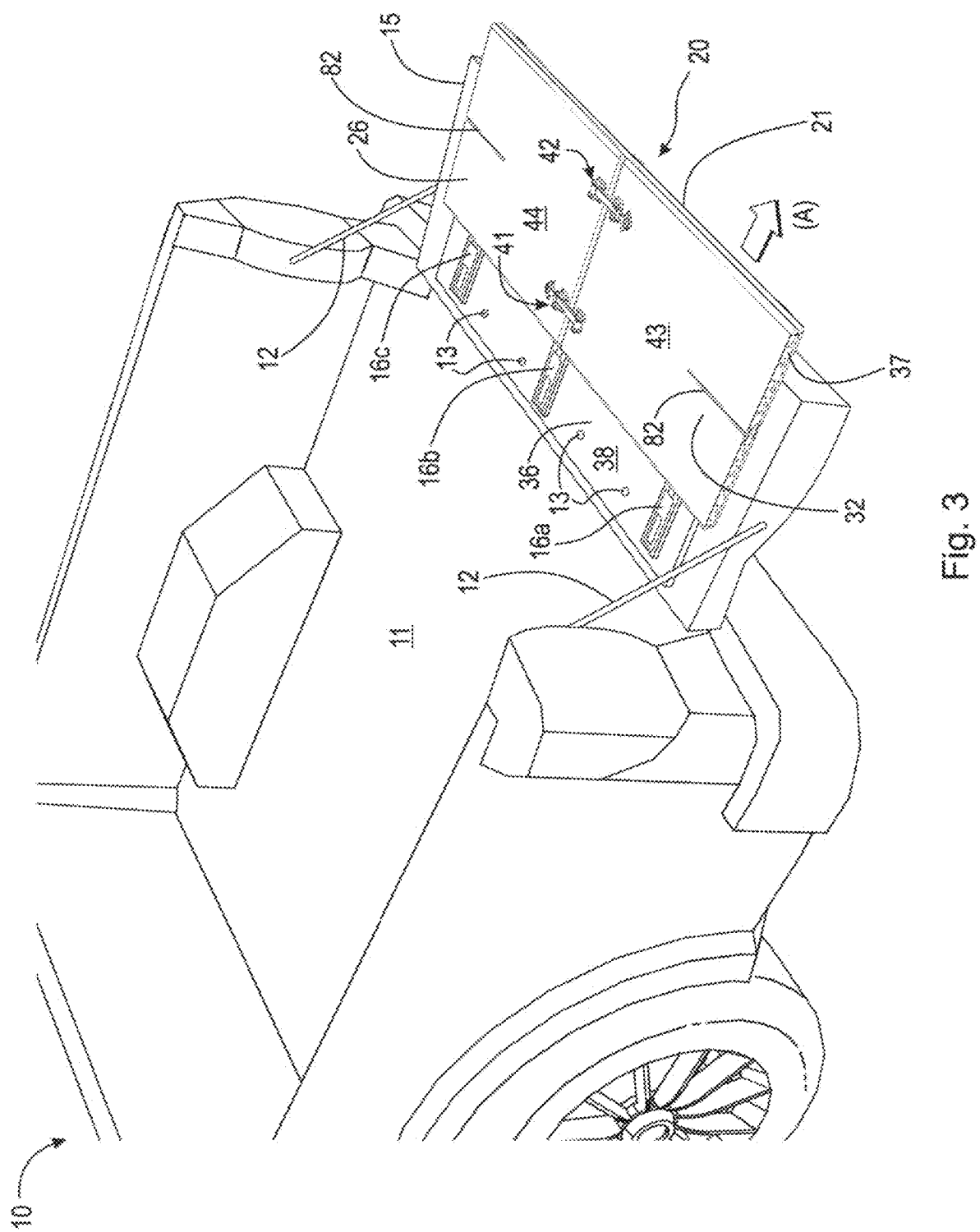
FIG. 3 is a view similar to that of FIG. 2 but with the extension table shown extending outwardly from the vehicle prior to opening of the table.

FIG. 3 is a top perspective view of vehicle 10 shown in FIG. 2 with the tailgate 15 shown in an open configuration, but with extension table 20 shown moving translationally away from the truck bed 11 along the path of arrow A. Base member 36 and sliding mechanisms 16a, 16b, and 16c are partially exposed in this drawing.

Figure 4:
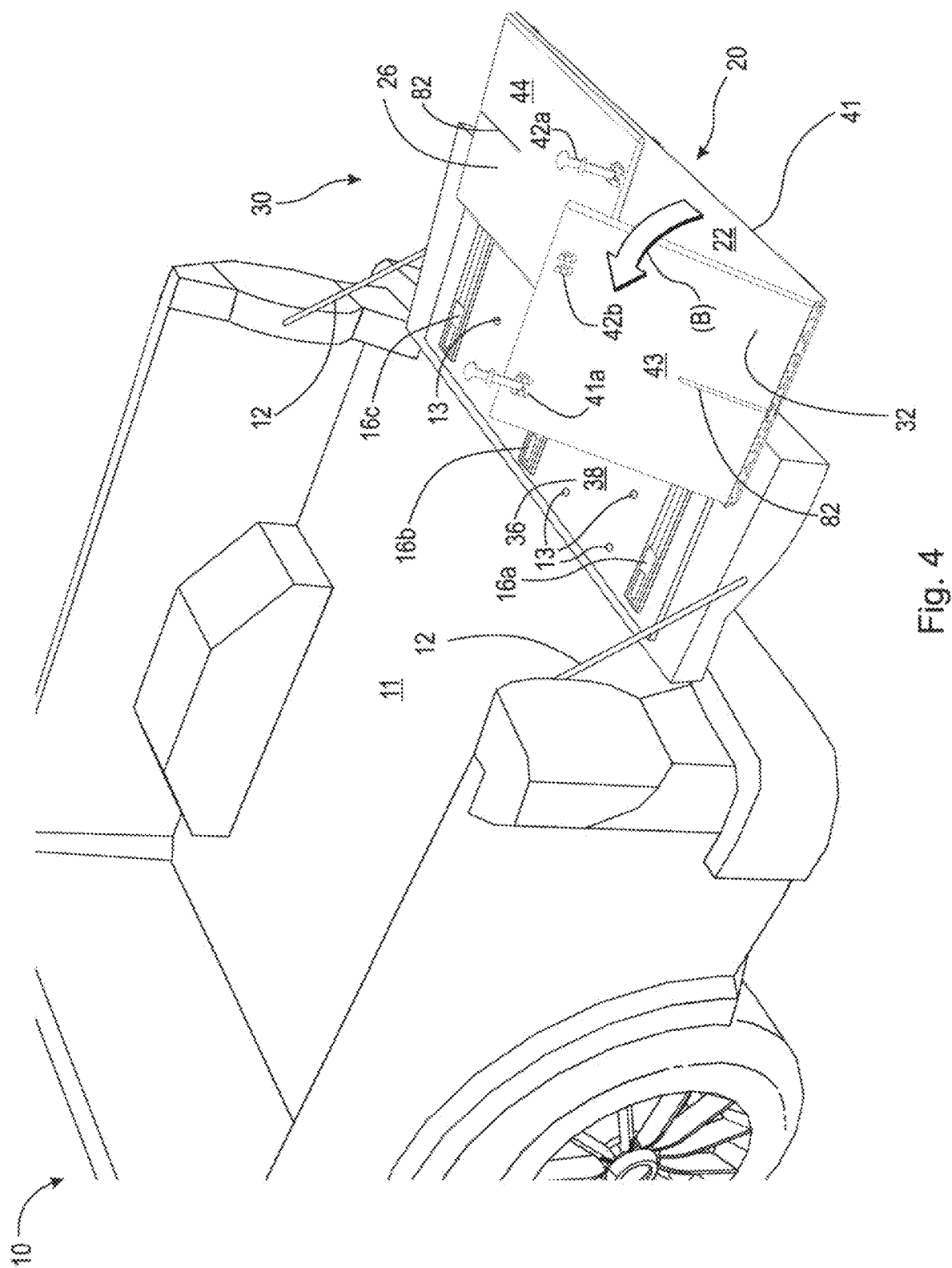
FIG. 4 is a view similar to that of FIG. 3 but with the extension table of the present invention completely extended outwardly from the rear of the vehicle, and in the process of being unfolded.

FIG. 4 is a top perspective view of vehicle 10 shown in FIG. 3 with the tailgate 15 shown in an open configuration, but extension table 20 is illustrated translating away from the truck bed 11 to the full extension capacity of the sliding mechanisms 16a, 16b, and 16c. The left wing panel 32 is shown pivoting away from the center panel 21 along the path of arrow B.

Figure 5:
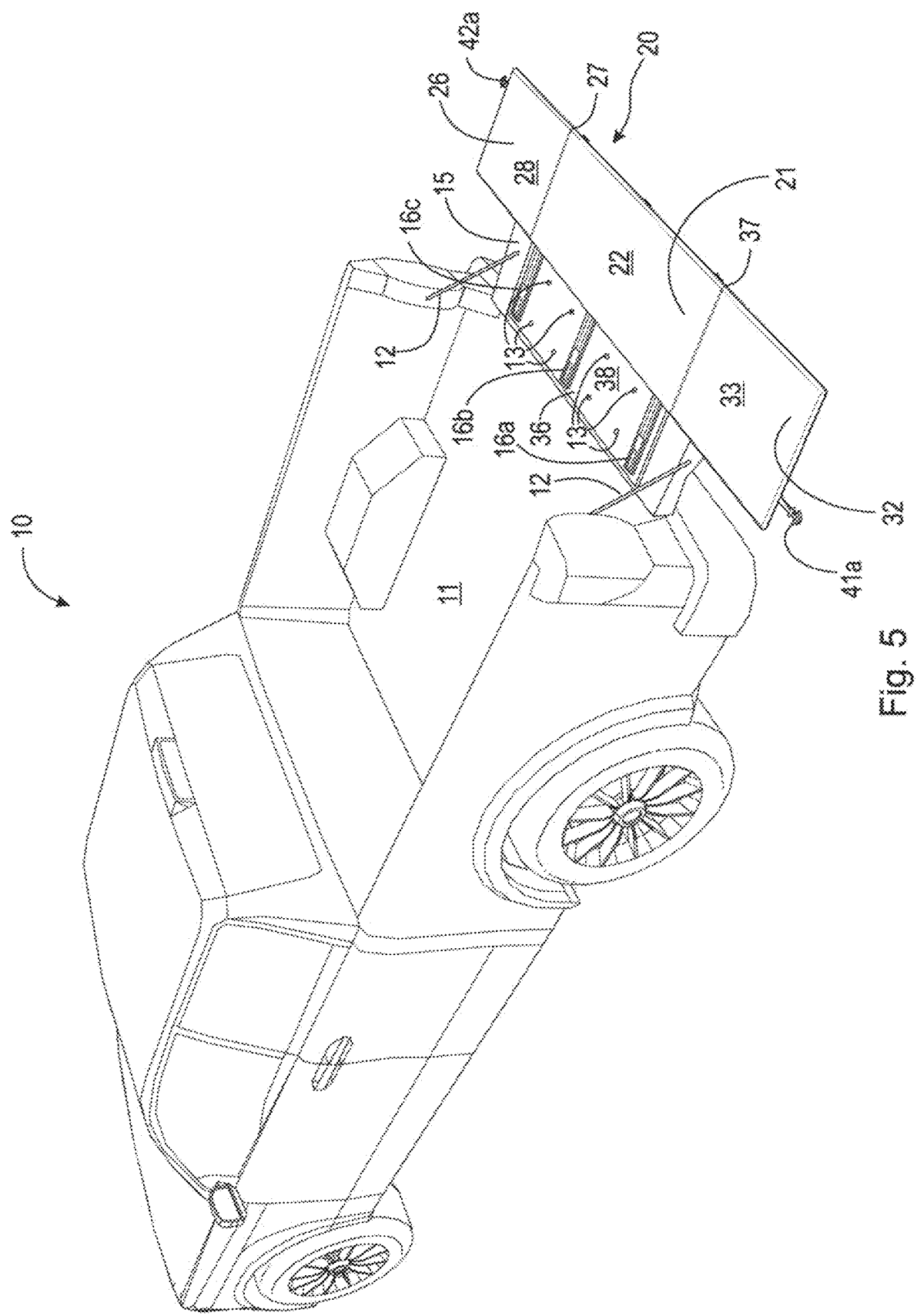
FIG. 5 is a view similar to that of FIG. 4 but with the extension table completely extended outwardly from the rear of the vehicle and completely unfolded.

FIG. 5 is a view similar to that of FIG. 4 but showing the table completely extended rearwardly from the vehicle, and also unfolded into an open orientation. It is seen in this drawing how the table of the invention provides a substantial extended work space proximate the bed of the truck.

Figure 6:
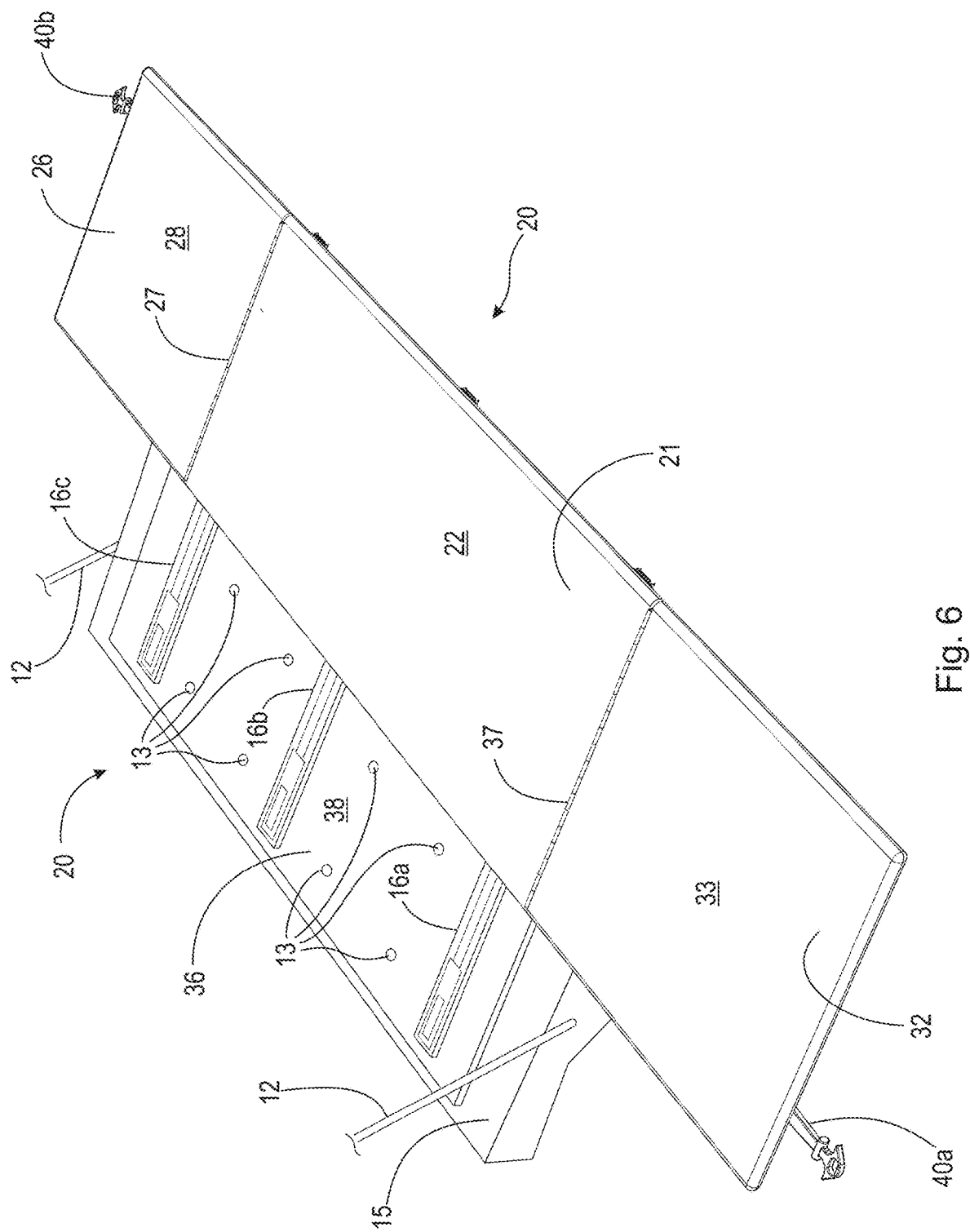
FIG. 6 is an enlarged view of the extension table shown in FIG. 5.

FIG. 6 is a top perspective view of extension table 20 shown in an open, extended configuration. The table assembly 20 is operatively arranged to move translationally along the slide guides 16a, 16b, and 16c, substantially parallel to base member 36. The proximal end of right wing panel 29 is pivotably connected to the right edge of center panel 24 with right wing hinge 27. The proximal end of left wing panel 34 is pivotably connected to the left edge of the center panel 25 with a left wing hinge 17. This view also shows how base member 36 is affixed to tailgate 15 via bolts 13.

Figure 7:
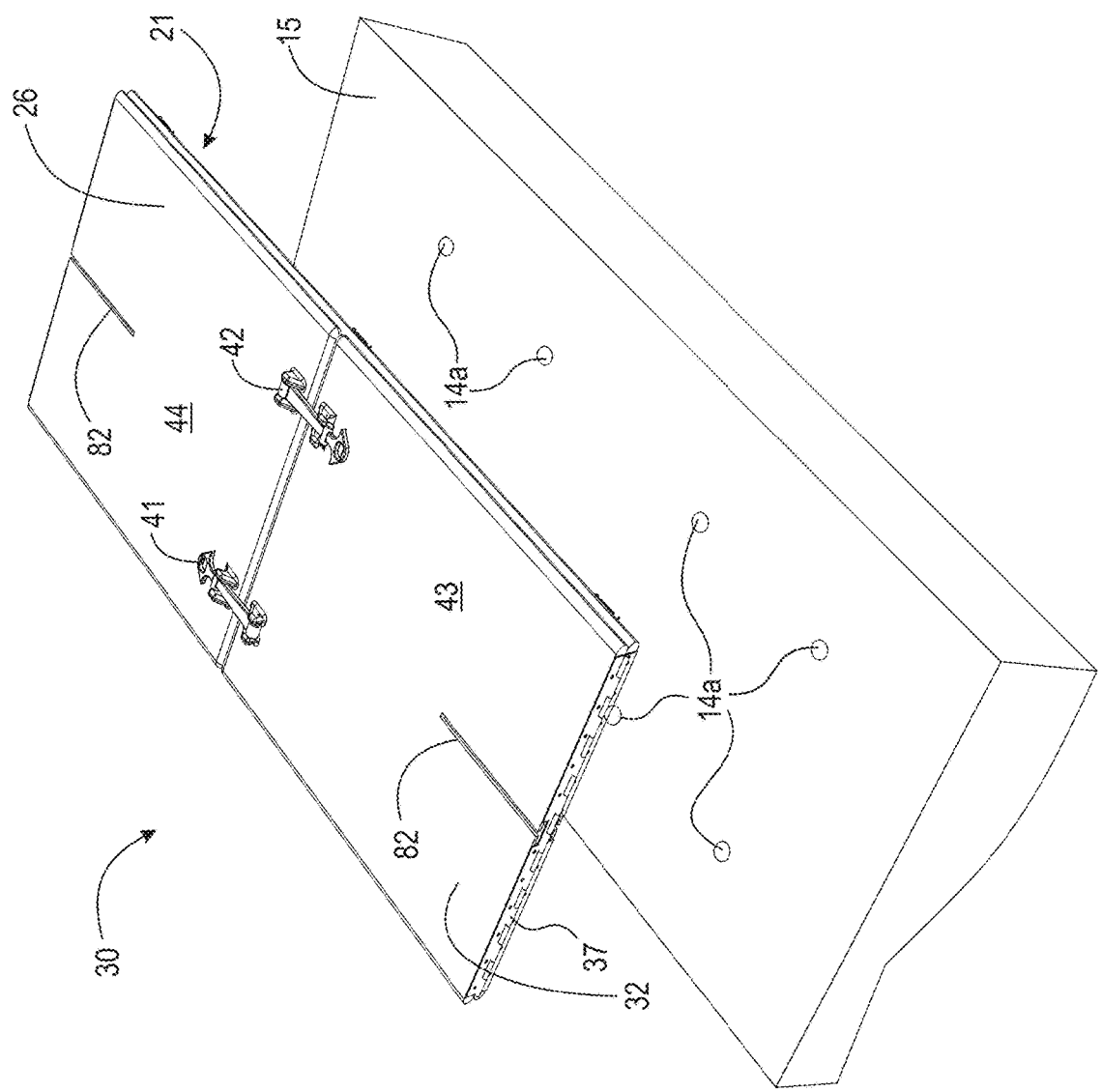

FIG. 7 is an exploded view of the extension table of the present invention, shown above a vehicle tailgate to which it is arranged to be secured to tailgate 15. The aforementioned bolts 13 are arranged to threadably engage apertures 14a in the top surface of the tailgate.

Figure 8:
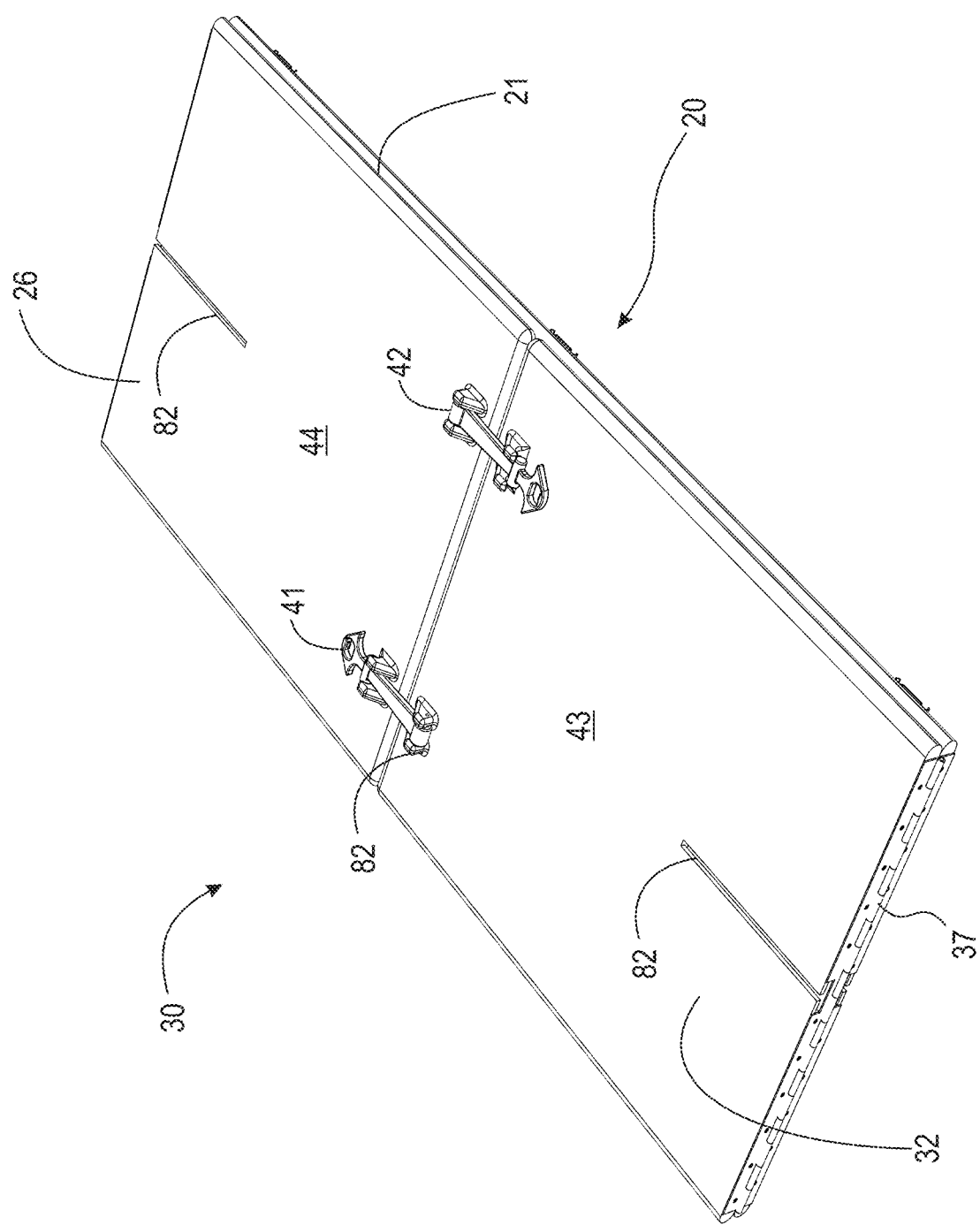
FIG. 8 is an enlarged view of the extension table shown in FIG. 7.

FIG. 8 illustrates the extension table assembly 20 of the present invention in a closed, retracted configuration such that base member 36 is arranged below extendable table assembly 30 and the sliding portions 18 of the sliding mechanisms 16 are retracted within the guides 19 (not shown in this view). In the closed configuration, the left wing panel 32 and right wing panel 26 are folded such that the top surface of each wing panel 26, 32, rests upon the top surface of the center panel 22. Fasteners 41 and 42 are arranged to secure right wing panel 26 and left wing panel 32 against the top surface of the center panel 22. In a preferred embodiment, fasteners 41 and 42 are pull latches, however, other fasteners are contemplated including, but not limited to, magnetic fasteners, hook and loop, pins and hooks, strap and snap fastener, or other latches.

Figure 9:
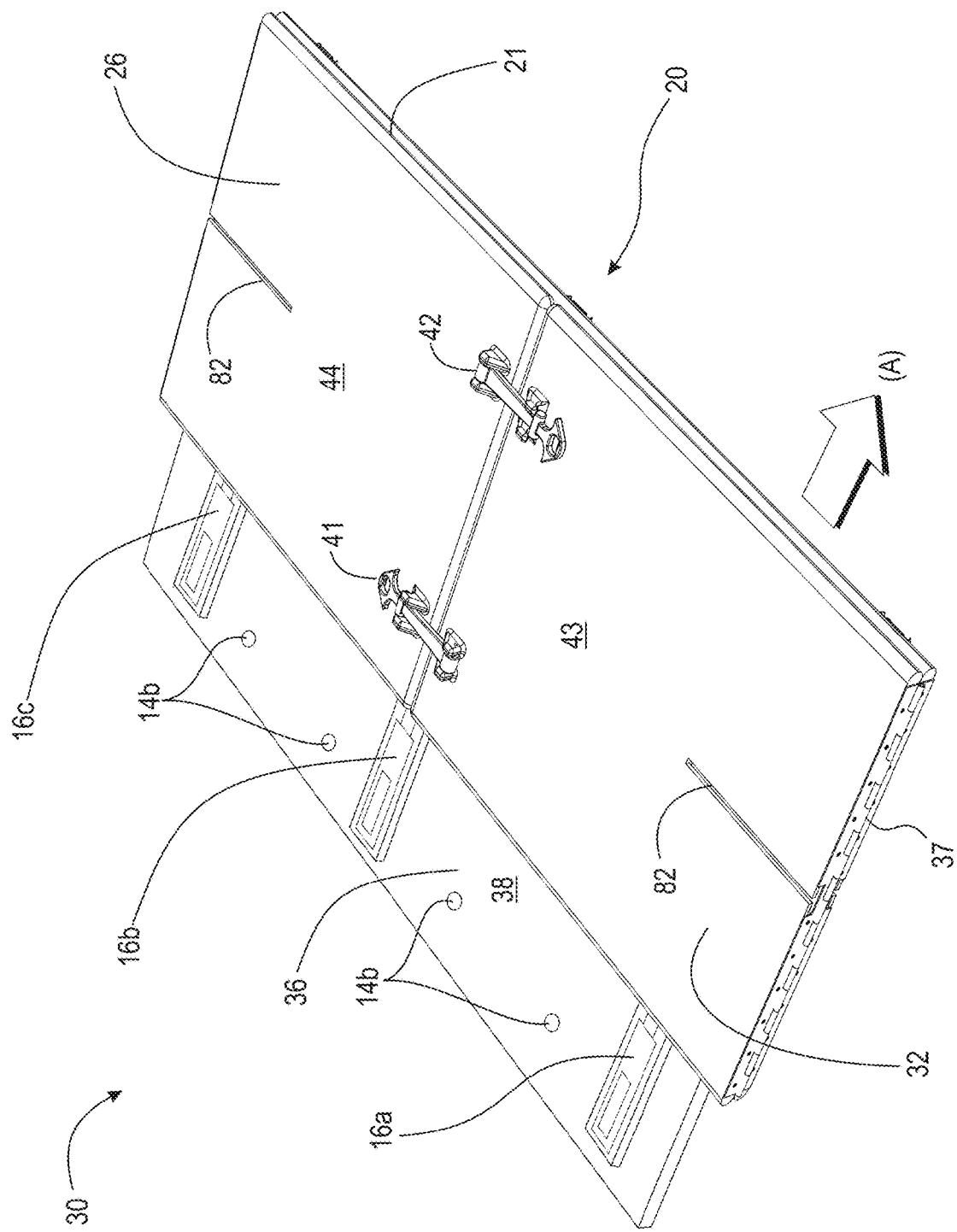
FIG. 9 is a view similar to that of FIG. 8, showing the table in the process of being extended from base member 36.

FIG. 9 illustrates the table assembly 30 translating relative to the base member 36 between a retracted and extended configuration (see arrow A). While the illustrated sliding mechanism 16 is a drawer mechanism, it will be appreciated that any sliding mechanism suitable for allowing translation of the table assembly 30 relative to the base member could be used to effect this translational movement.

Extension table assembly 30 is extended away from the base member 36 to allow for full extension of the right wing panel 26 and the left wing panel 32 to attain the fully open configuration. In the open, extended configuration, base member 36 and the guides 19 of sliding mechanisms 16 are exposed. The sliding portion 18 is fixedly attached to the bottom surface of the center panel 23, operatively engaged with the guide 19 and is extended to translationally displace the table relative to the base member 36 and attached tailgate 15. Although three sliding mechanisms 16a, 16b and 16c are shown in the illustrated embodiment, the same effect can be obtained with at least one or two sliding mechanisms. As described infra, extension table 20 is attached to tailgate 15 by a plurality of screws or bolts 13 engaged with base member 36 through a plurality of apertures 14b (partially shown in FIG. 11). The apertures in base member 36 may arranged to match the configuration of screw holes 14a in the tailgate itself (shown in FIG. 7) to secure the table to the tailgate of the vehicle, although where no attachment holes are present, self-tapping screws or another appropriate means of securing may be utilized, including, but not limited to bolts, adhesive or epoxy, straps, or latches, to secure base member 36 to tailgate 15. While the illustrated vehicle 10 is a pickup truck, it should be appreciated that other vehicle types, such as utility vans, station wagons, sport-utility vehicles, utility and recreation all-terrain vehicles, or other utility vehicles include a suitable mounting surface for the extension table 20.

Figure 10:
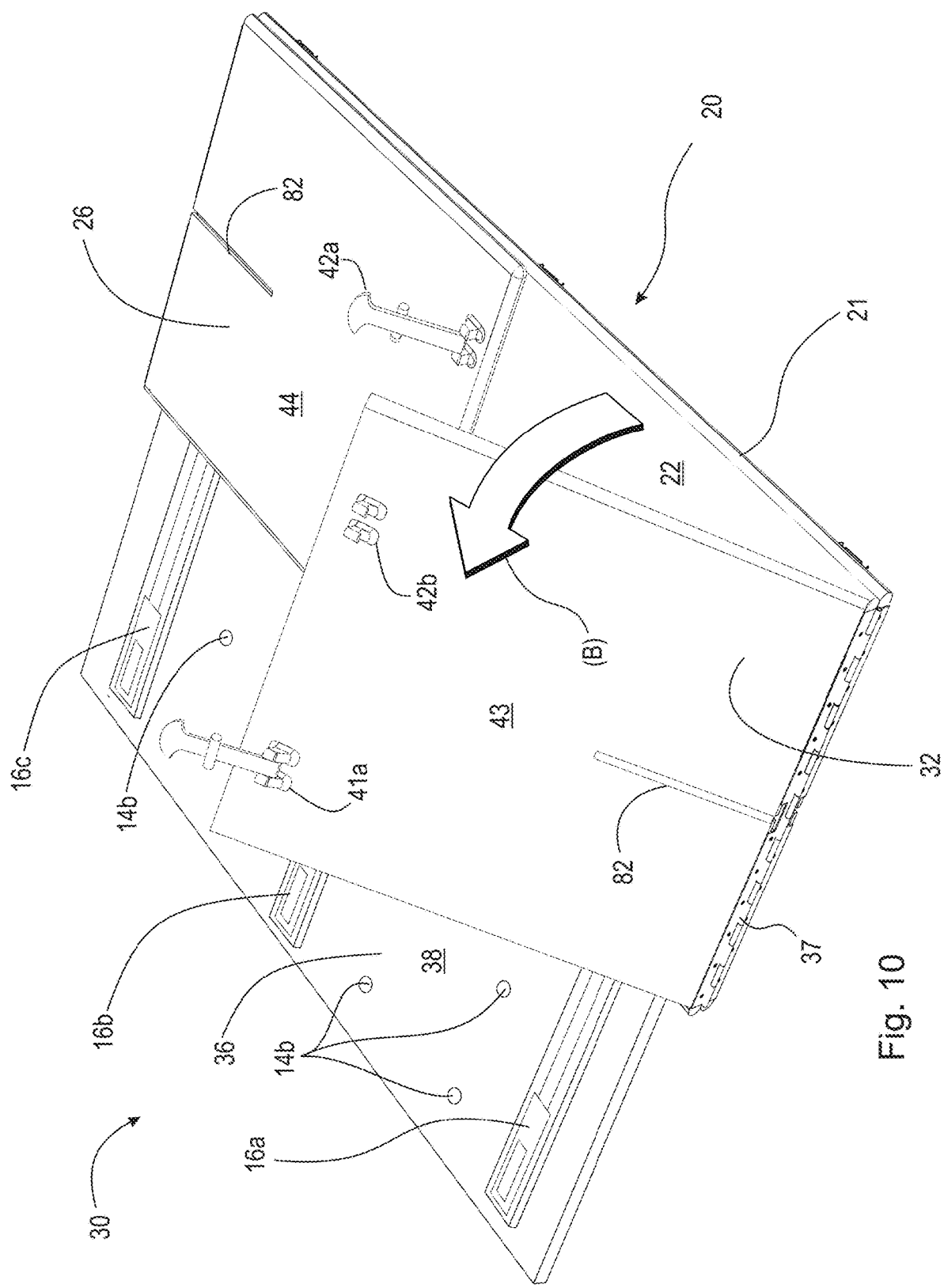
FIG. 10 is a view similar to that of FIG. 9, showing the table in the process of being unfolded.

FIG. 10 is a view similar to that of FIG. 9, showing the table in the process of being unfolded.

Figure 11:
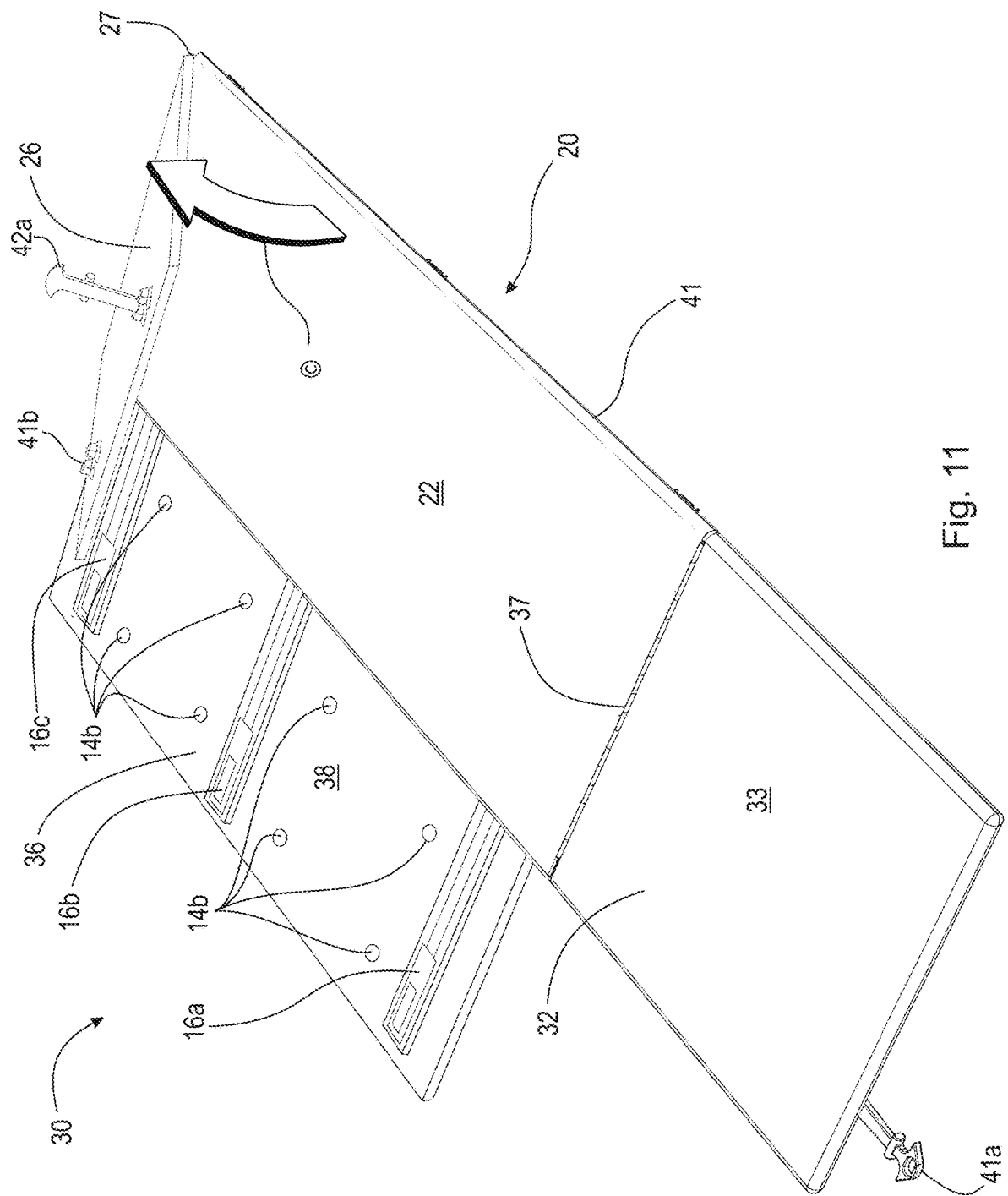
FIG. 11 is a view similar to that of FIG. 10.

FIG. 11 is a view similar to that of FIG. 10, showing left wing member 33 unfolded and right wing member 28 in the process of being unfolded.

Figure 12:
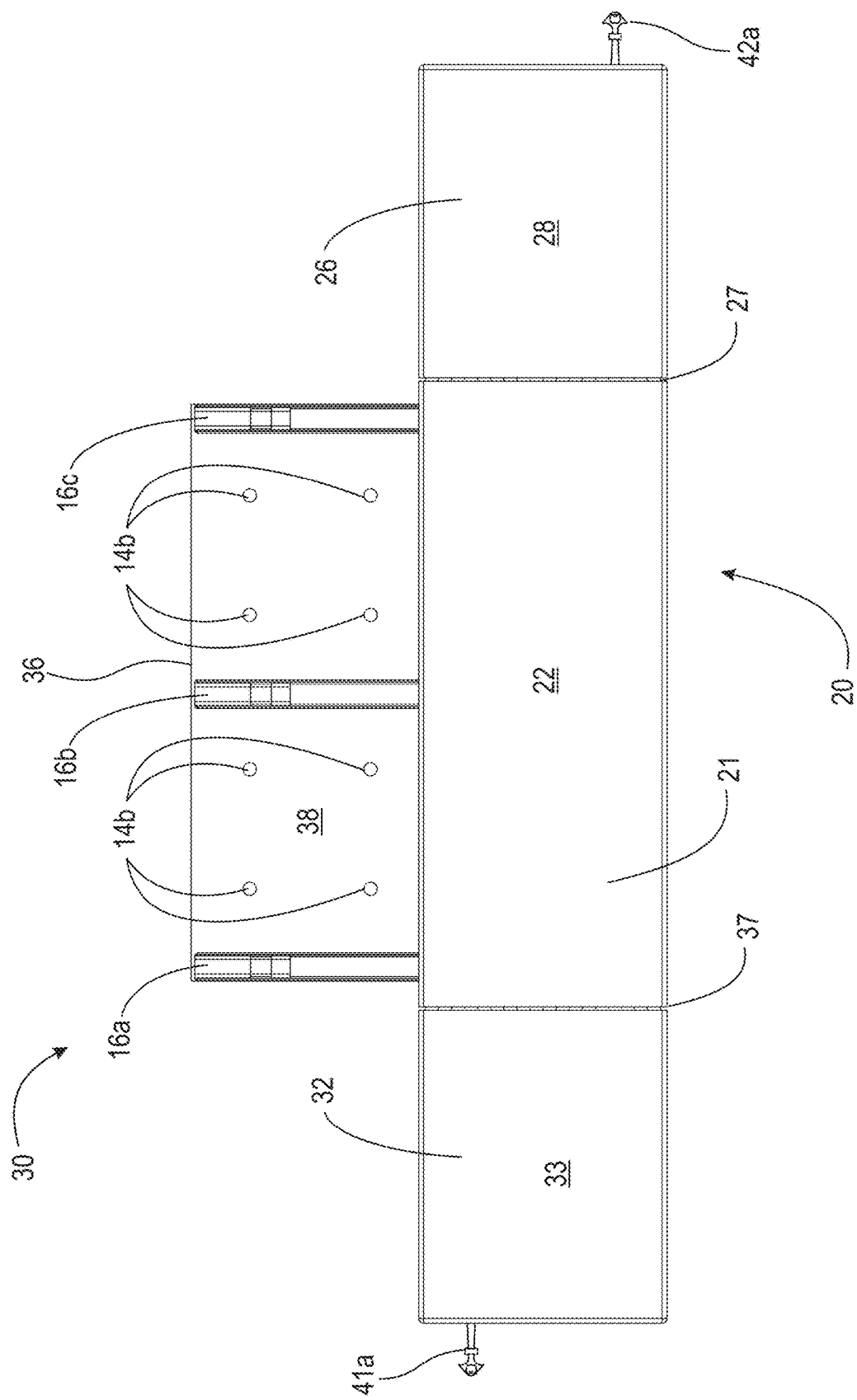
FIG. 12 is a top view of the extension table in a fully open and extended configuration.

FIG. 12 is a top view of the extension table in a fully open and extended configuration.

Figure 13:
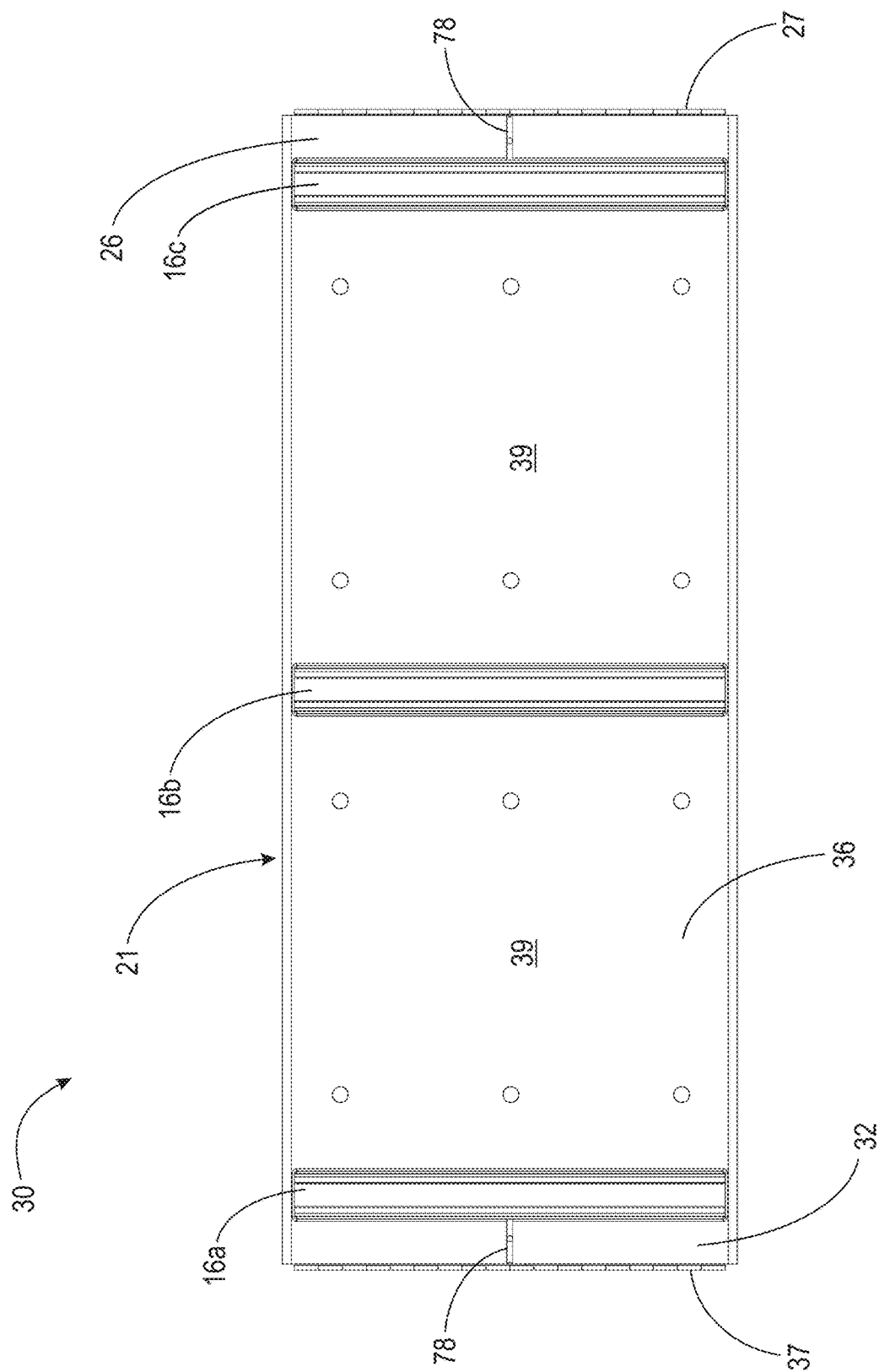
FIG. 13 is a bottom view of the extension table in a closed, retracted configuration.

FIG. 13 is a bottom view of the extension table in a closed, retracted configuration.

Figure 14:
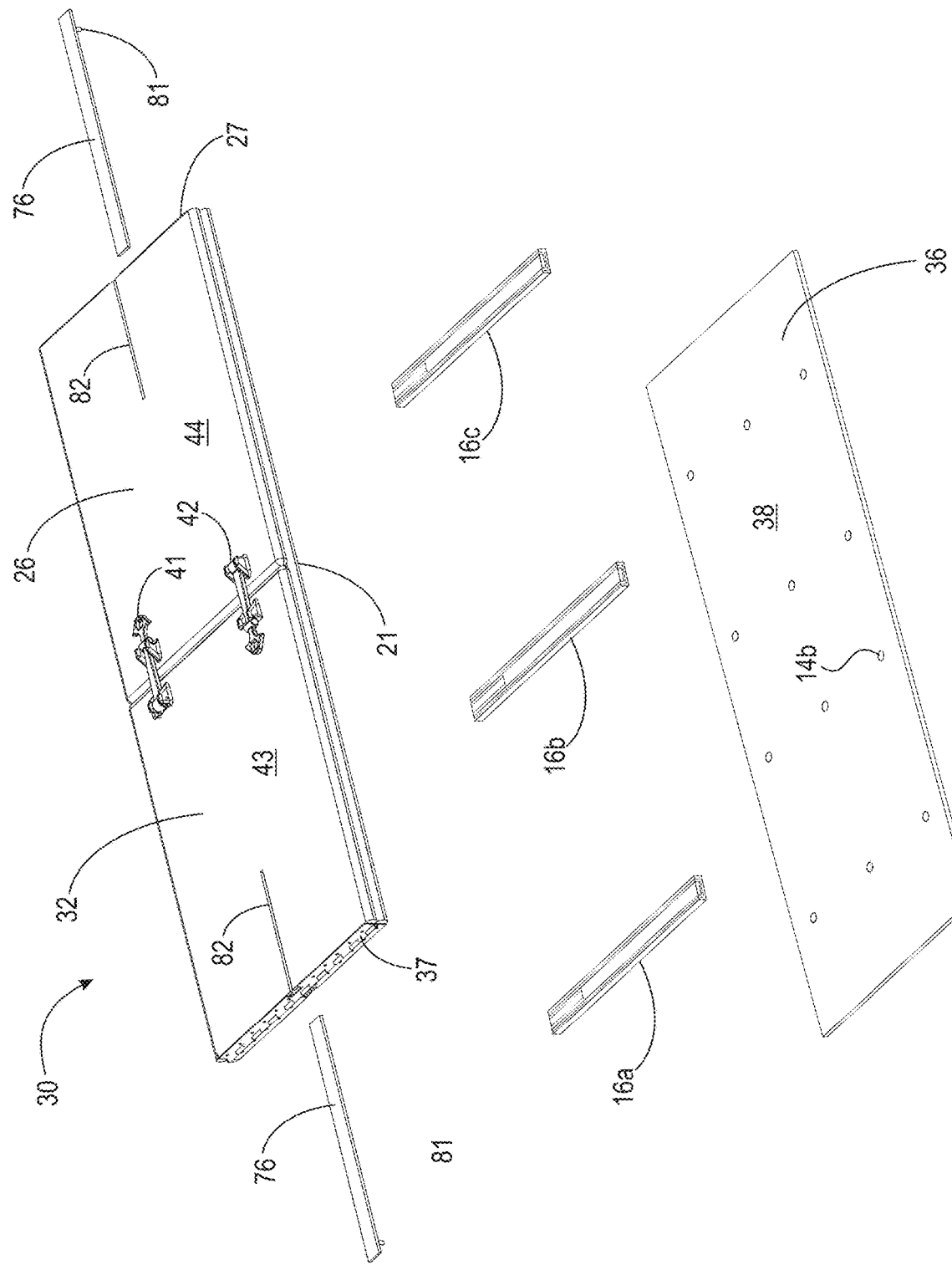
FIG. 14 is an exploded view of the extension table assembly in a closed, retracted configuration.

FIG. 14 is an exploded view of the extension table assembly in a closed, retracted configuration.

Figure 15:
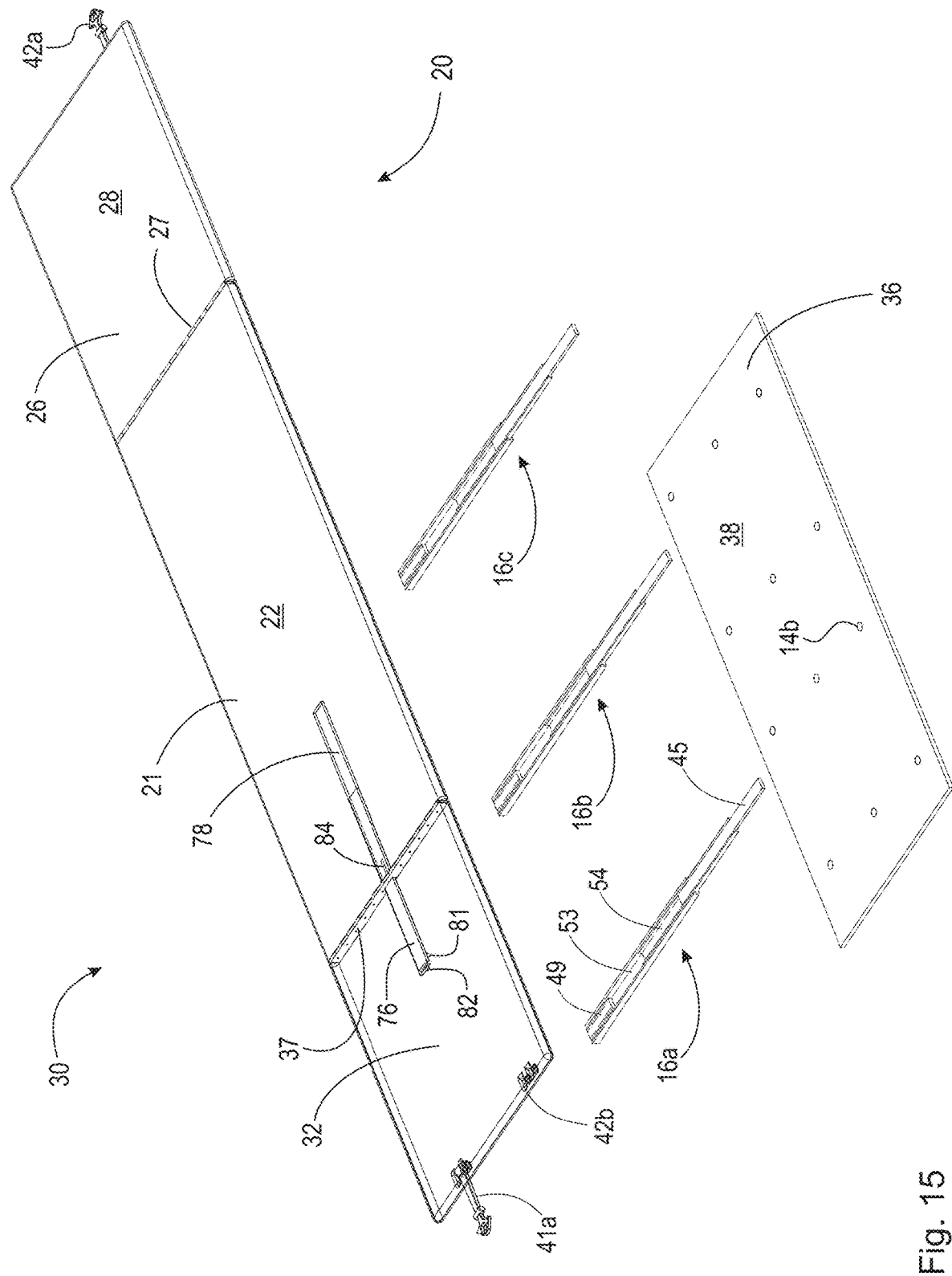
FIG. 15 is an exploded view of the extension table in an open, extended configuration.

FIG. 15 is an exploded view of the extension table in an open, extended configuration.

Figure 16:
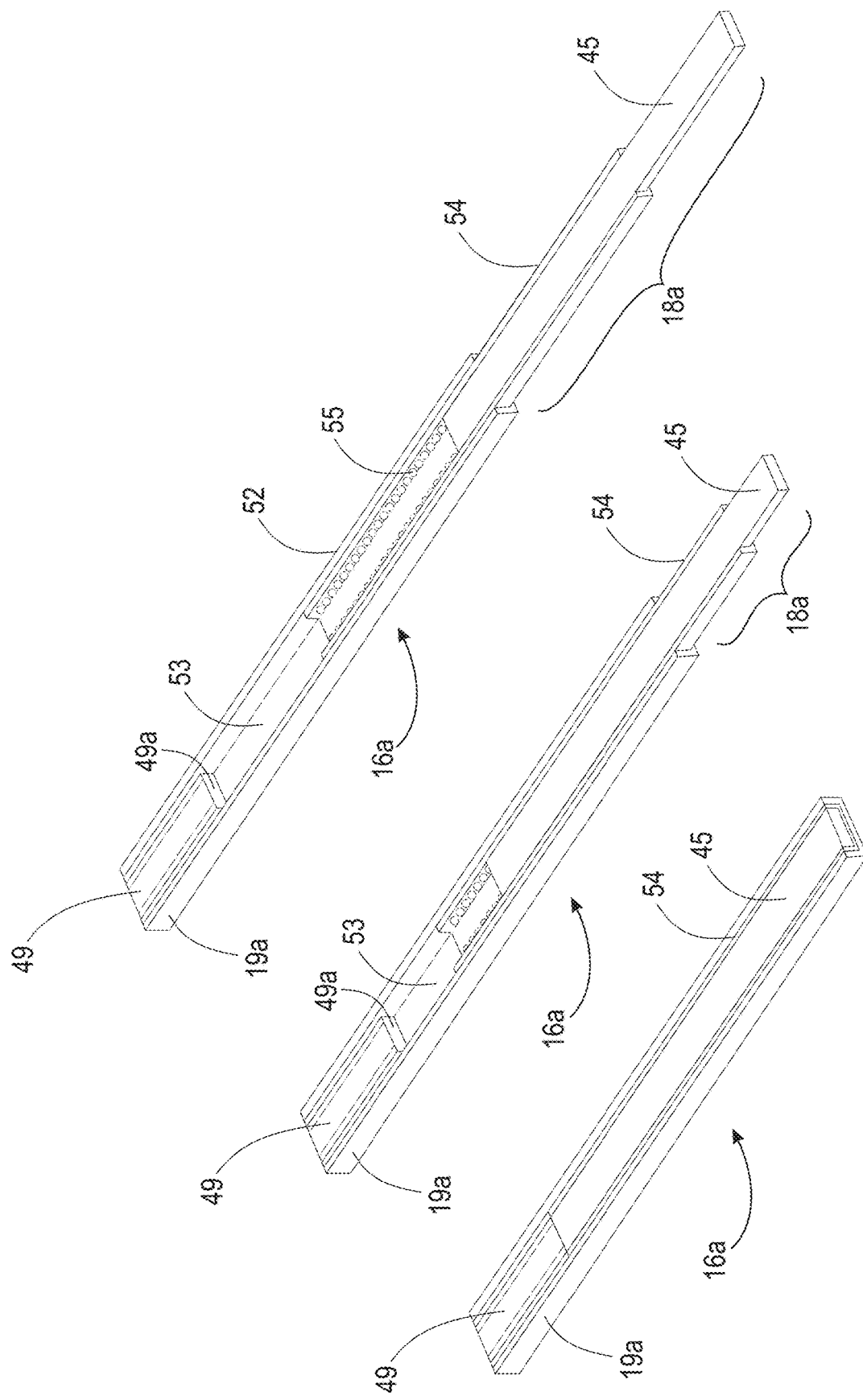
FIG. 16A is a perspective view of a sliding mechanism of the invention in a retracted orientation.
FIG. 16B is a view similar to that of FIG. 16A but with the sliding mechanism in the process of being extended.
FIG. 16C is a view similar to that of FIG. 16B but with the sliding mechanism fully extended.

FIGS. 16a-16c illustrate the preferred embodiment of the sliding mechanism 16 utilized in the present invention. FIG. 16a depicts one of the sliding mechanisms 16a, 16b, or 16c in a fully retracted configuration as if the table were in a stowed position. Sliding mechanism 16a, 16b, or 16c serves to couple base member 36 to table center panel 21 and comprises a guide 19a, 19b, or 19c having flat surface 51, guide rails 52, and a housing cavity 54, at least one sliding portion 18a, 18b, or 18c having a sliding body 45, sliding rails 46, and a stopper 48, a dampener 49 fixedly secured to one end of the guide and having a resistive component 49a, and a plurality of rollers 49b. To allow for translation of the extension table 20 away from vehicle 10 while remaining secured to the vehicle, the guide 16a, 16b, or 16c is fixedly secured to base member 36 by a plurality of screws, bolts, or other securing means inserted into apertures 14b and secured to corresponding apertures 14a in tailgate 15.

At least one sliding portion 18a, 18b, 18c, 17a, 17b, or 17c is engaged with guide 16a, 16b, or 16c to effectuate the desired extendable attachment. In the preferred embodiment, a sliding portion 18a, 18b, or 18c is slidably affixed to a guide through a plurality of rollers 55 arranged between guide rails 52 of guide 16 and the sliding rails 46 of sliding portion 18. It should be appreciated that the rollers may be in the form of ball bearings, wheels, or other suitable roller may be utilized. As illustrated in FIG. 16b, the sliding mechanism 16 may be extended through the application of force in a direction substantially away from dampener 49. As illustrated in FIG. 16c, sliding mechanism 16 may be fully extended until stopper 48 prevents further extension.

Retraction of sliding mechanisms 16 is achieved by applying force to sliding body or bodies 18a,18b in a direction toward dampener 49, situated within the housing cavity/channel of guide 16. Contact of sliding body 18 with dampener 49, initiates a soft closing process in which dampener 49 decelerates and counters the applied closing force to generate constant closing motion until the closed configuration is achieved. In the preferred embodiment, sliding portion 18, engages a resistive component which draws sliding portion 18 into the retracted configuration at a constant rate. Notably, other soft closing methods are contemplated including mechanisms utilizing an air spring, spiral spring, opposing magnetic forces, friction, or other resistive forces.

The present invention requires at least one sliding portion 18; however, multiple sliding portions can be engaged in a nested fashion, such that one sliding portion 18a is secured to the table center panel 21, and an intermediate sliding portion 18b is seated between the guide 19 and the secured sliding portion 18a as seen in FIGS. 16b-16c to allow for telescopic extension.

The table apparatus may utilize a single sliding mechanism 16, or a plurality of sliding mechanisms (e.g., 19a, 19b,19c) to achieve extendable capability sufficient to extend beyond tailgate support cables 12. The preferred sliding mechanism contemplated by the present invention is disclosed in U.S. Pat. No. 8,590,989 (Lowe), incorporated herein by reference. Other similar sliding mechanisms may be substituted for this mechanism.

Figure 17:
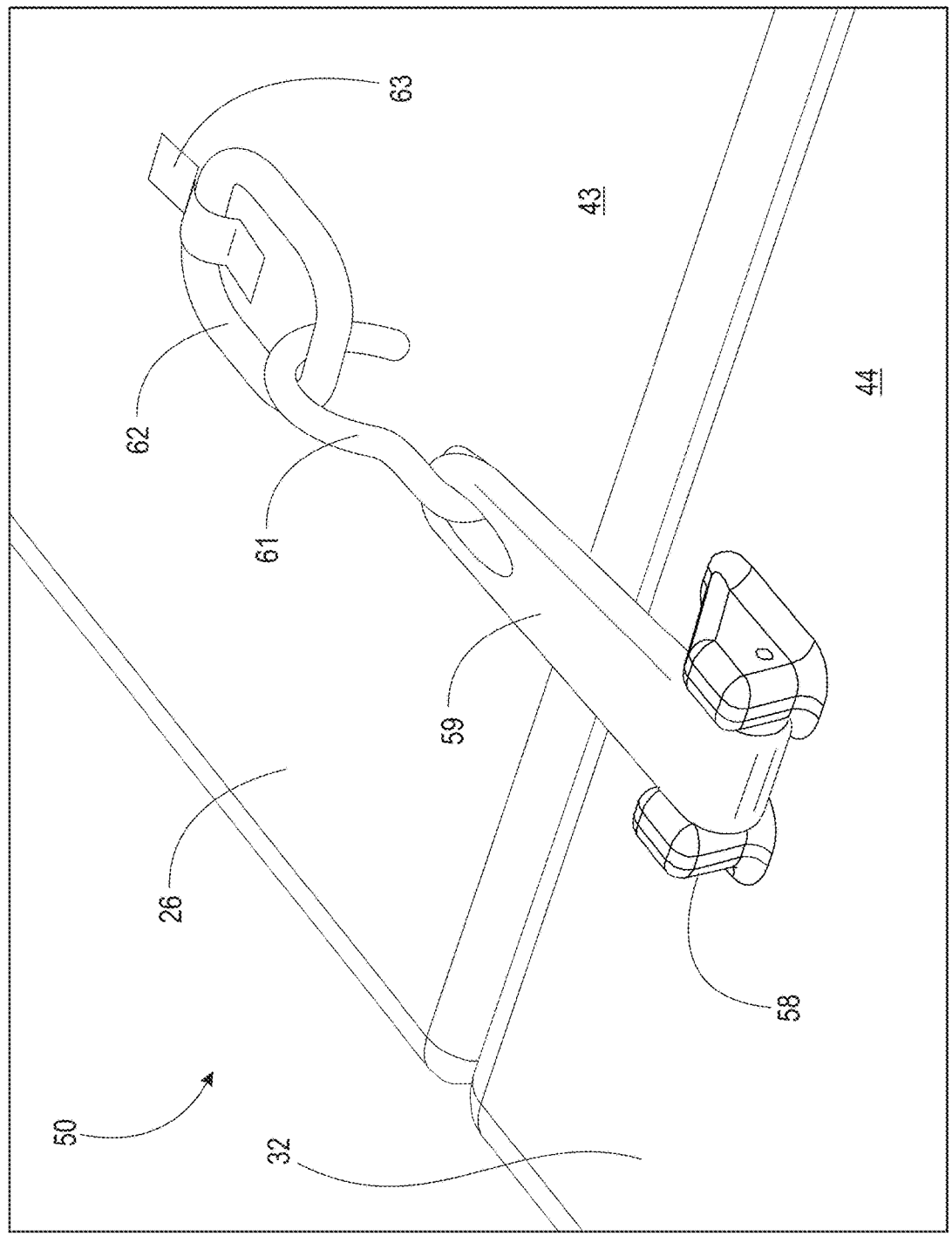
FIG. 17 is a fragmentary perspective view of an embodiment having a securing mechanism, wherein the securing mechanism is a pull latch.

FIGS. 17-21 illustrate example embodiments of fasteners other than the draw latch fasteners 41 and 42 contemplated in the present invention. In each of the embodiments, the table may be secured through the use of a single fastening device or a plurality of devices. Alternatively, multiple fastening mechanisms may be utilized together to achieve the desired effect. FIG. 17 depicts a pull latch fastener apparatus 50. The pull latch 59 is attached to a metal hook 61 and are operatively arranged to engage a fastening loop 62, such that the pull latch introduces tension between the left wing panel and right wing panel which prevents either from extending. In the preferred embodiment, pull latch 59 is a rubber strap having an fastening hook 61, which, when stretched and deployed, engages with loop 62, attached to the opposite wing panel by loop fastening bracket 63, preventing the table from opening. In another embodiment, pull latch 59 comprises a rubber strap having a substantially spherical body, which nests in a partial hook loop attached to the opposite wing panel. It should be appreciated that the components of pull latch fastener apparatus 59 may be made from any suitable material, such as, for example, metal, rubber, or another material.

Figure 18:
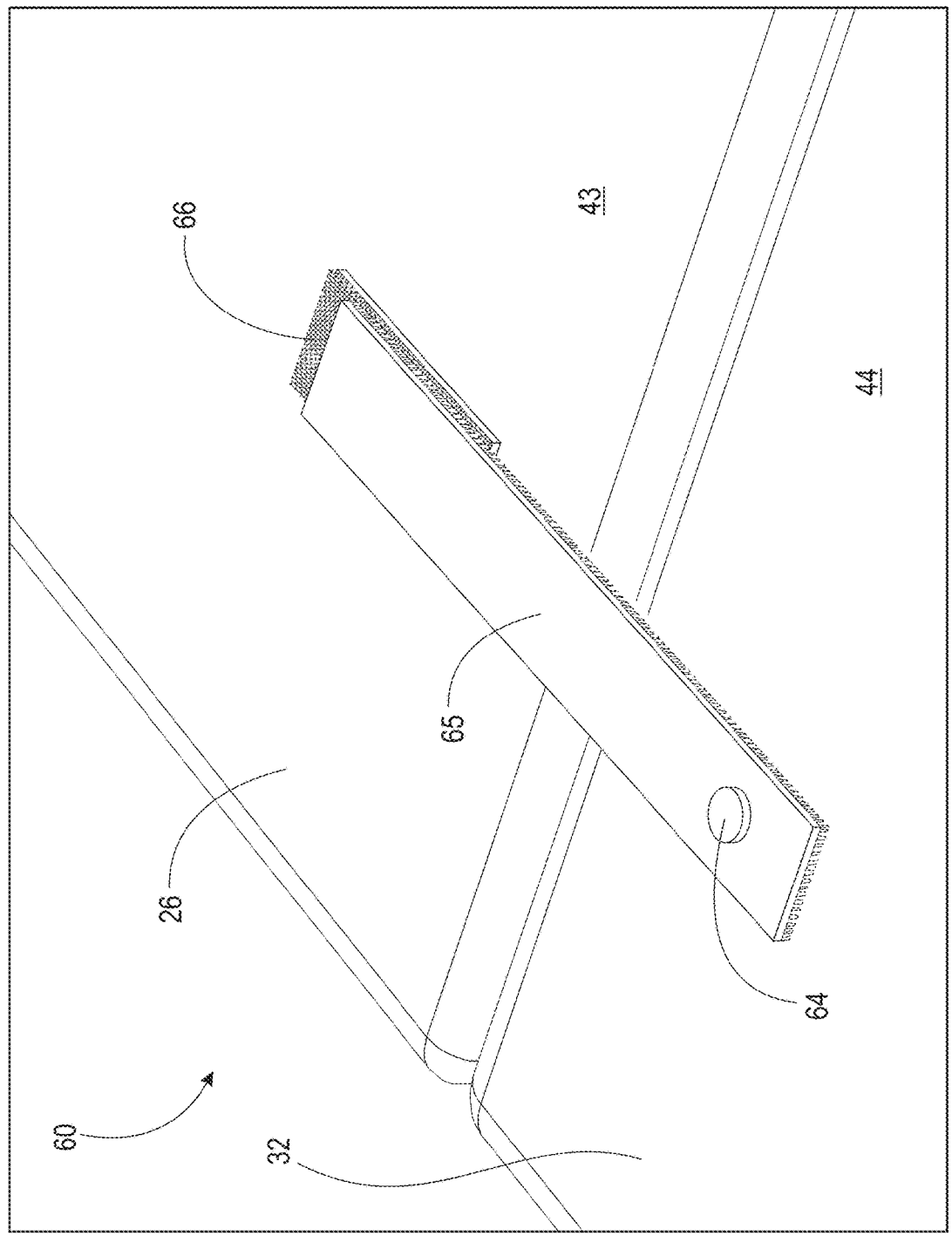
FIG. 18 is a fragmentary perspective view of an embodiment having a securing mechanism, wherein the securing mechanism is opposing hook and loop tapes arranged on the outer surfaces of the extension table.

FIG. 18 illustrates a hook and loop fastener apparatus 60. A fastening pin 64, secures a flexible hook tape 65, having a plurality of small hooks on the side secured against the wing panel bottom surface 43 or 44. Hook tape 65 engages a loop tape 66 securely fastened to the bottom surface of the opposite wing panel by adhesive or other securing means to prevent the table from assuming the open configuration. It should be appreciated that the hook tape 65 may be substituted for loop tape, and loop tape 66 for hook tape, so long as one of each is present. In an alternative embodiment, hook tape 65 is secured to the top wing surface 28 or 33, and the loop tape 66 is secured to the center panel top surface 22.

Figure 19:
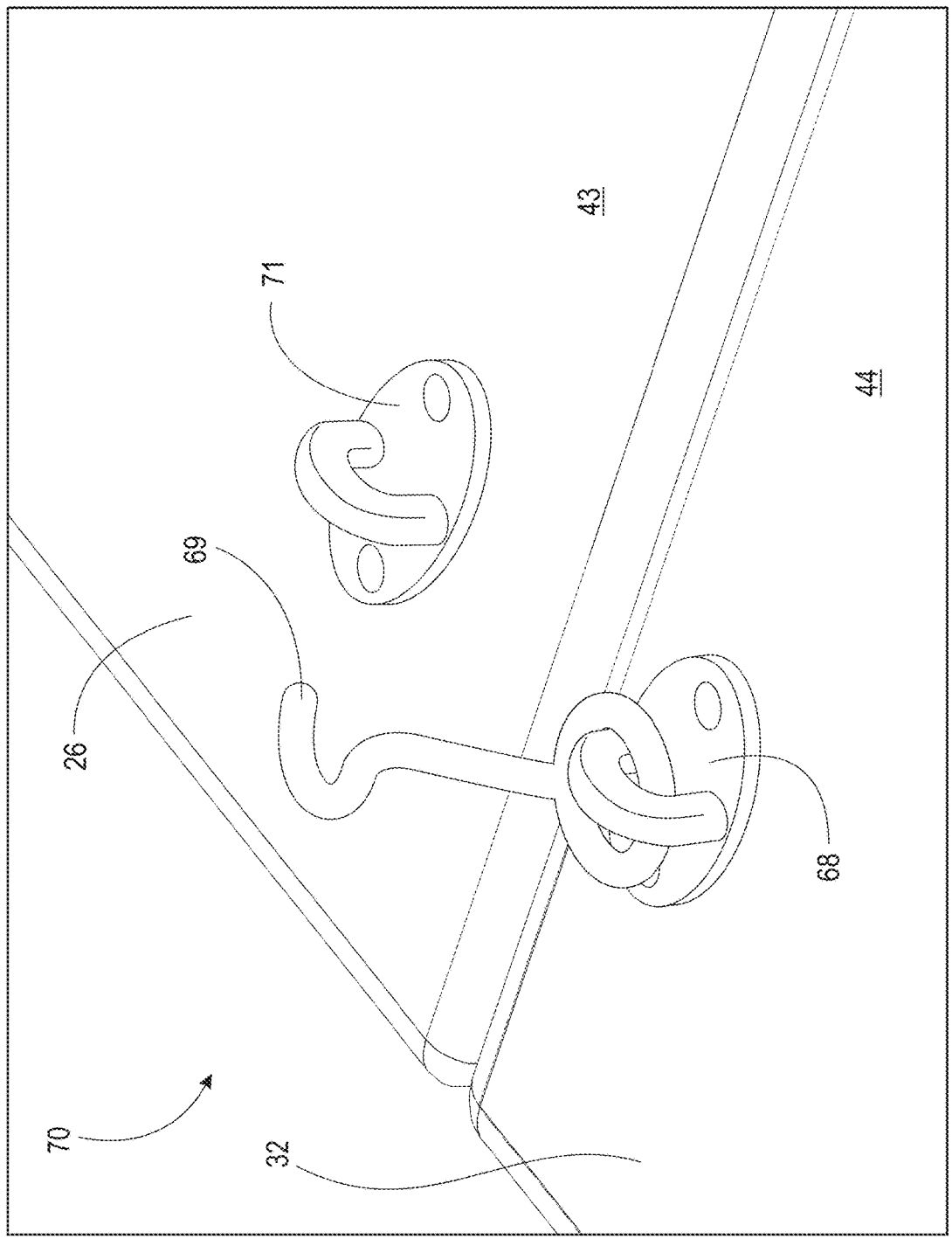
FIG. 19 is a fragmentary perspective view of an embodiment having a securing mechanism, wherein the securing mechanism is a metal hook and latch.

FIG. 19 depicts a pivot hook latch apparatus 70 for securing the table assembly. Hook latch base 68 secures latch hook 69 to the bottom surface of one of the table wing panel (e.g., 43,44). The table is secured by actuating latch hook 69 about its pivot point at hook latch base 68, such that the latch hook engages a pivot hook latch 71 secured to the bottom surface of the opposite wing panel.

Figure 20:
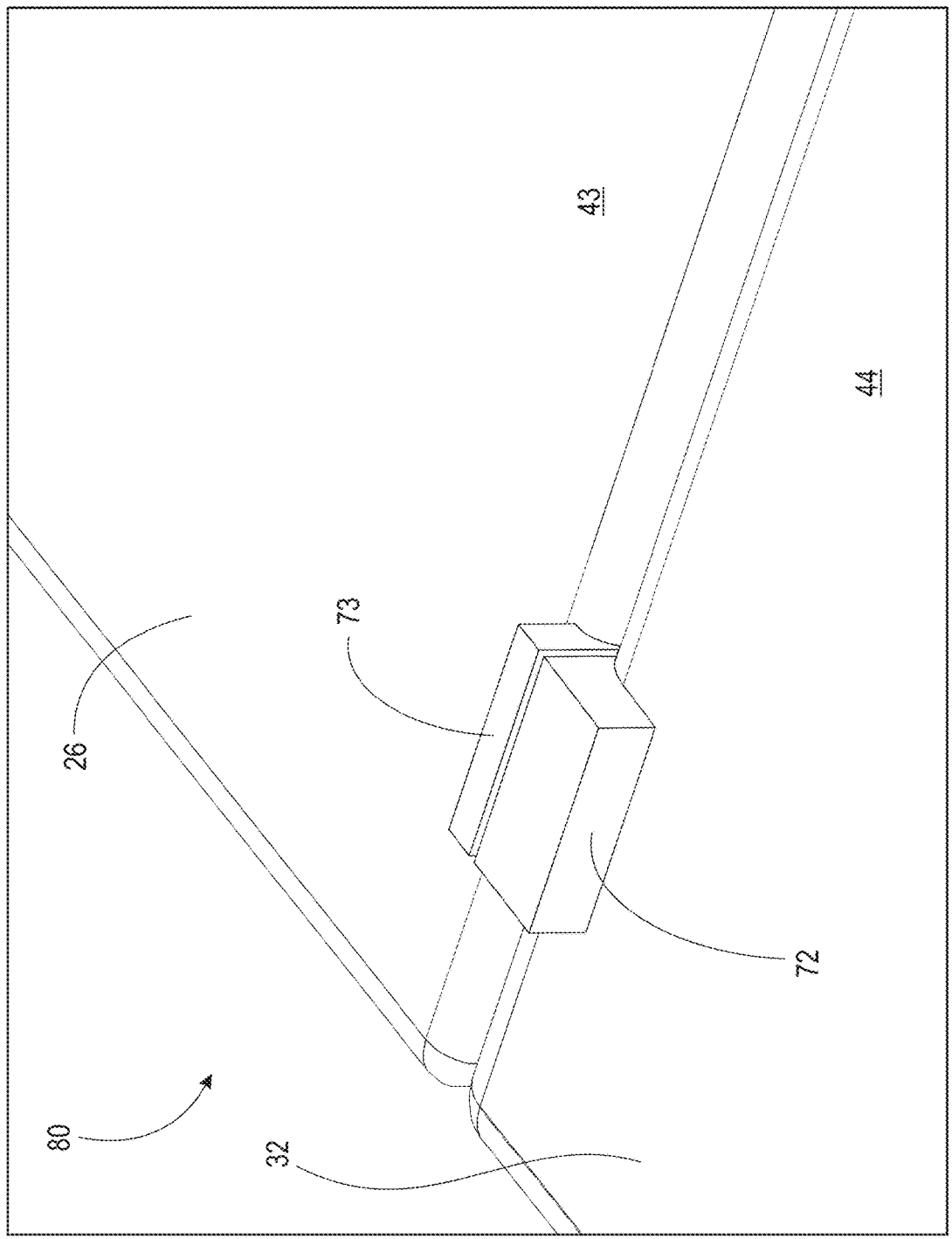
FIG. 20 is a fragmentary perspective view of an embodiment having a securing mechanism, wherein the securing mechanism is a magnet in combination with a ferromagnetic plate.

FIG. 20 illustrates a magnetic latch 80 wherein a magnet 72 is secured to one of the wing panels (e.g., 43,44) and a ferromagnetic plate is attached to the other. When magnet 72 and ferromagnetic plate 73 are arranged close to each other, the magnetic force between the magnet 72 and ferromagnetic plate 73 prevent the table from assuming an open configuration without external force. In the preferred embodiment, magnet 72 is a rare-earth magnet, such as a neodymium magnet, although other compositions are contemplated. In alternative embodiments, magnetic latch 80 comprises two or more magnets 72, operatively arranged to orient each respective poles and promote attraction. In an alternative embodiment, magnet 72 is embedded in the wing panel and ferromagnetic plate 73 is secured to the center panel top surface 21.

Figure 21:
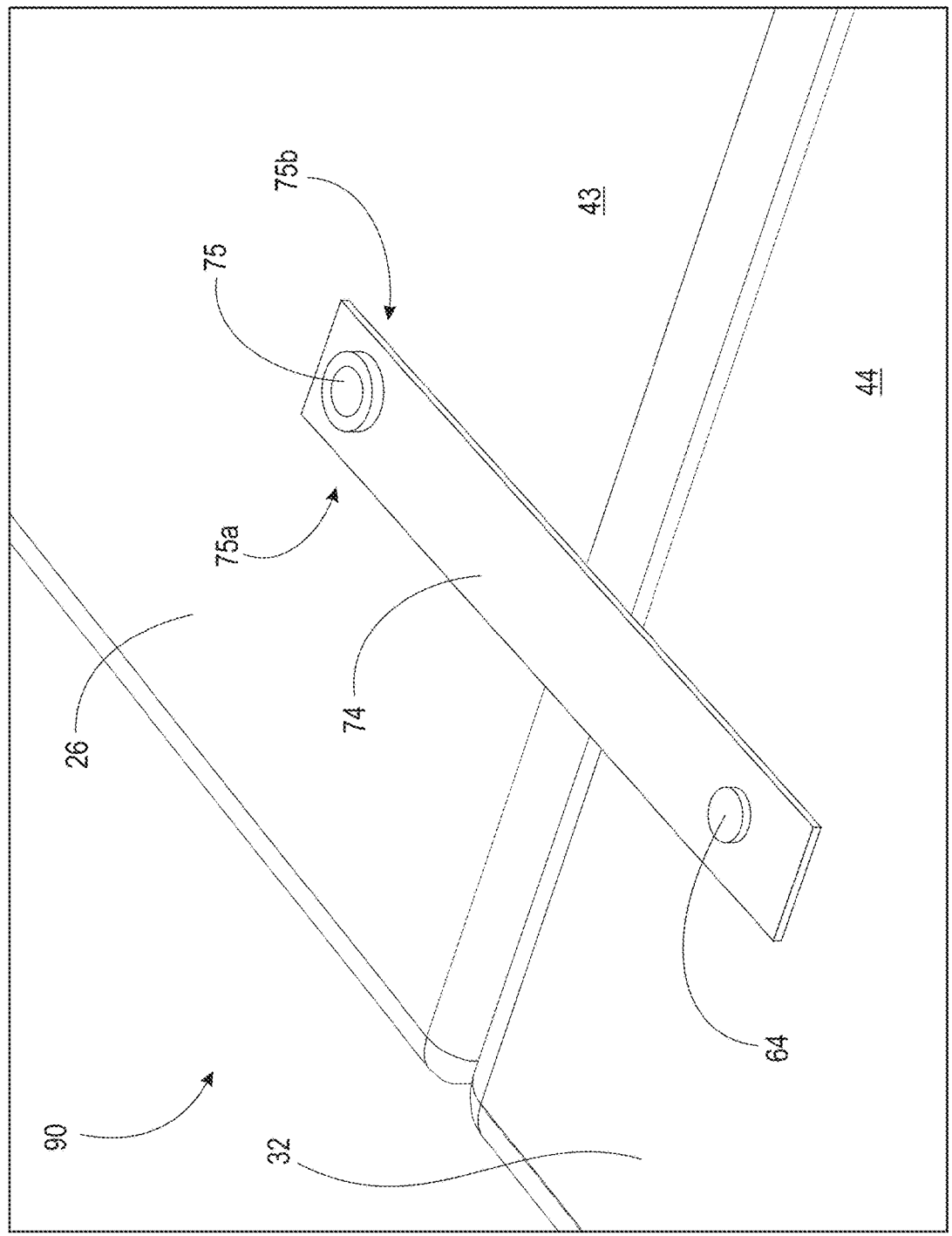
FIG. 21 is a fragmentary perspective view of an embodiment having a securing mechanism, wherein the securing mechanism is a snap fastener.

FIG. 21 illustrates a snapping strap fastener assembly 90 wherein a securing pin 64 attaches strap 74, having a snap fastener head 75a, to one of the wing panel top surfaces (e.g. 43,44). The table apparatus 20 is secured in the closed position by actuating strap 74 to engage snap head 75a with a snap nipple 75b fixedly secured to the opposite wing panel top surface. In an alternative embodiment, snap nipple 75b is located on the wing panel side. In a further alternative embodiment, snap nipple 75b is secured to the side of table center portion 21.

Figure 22A:
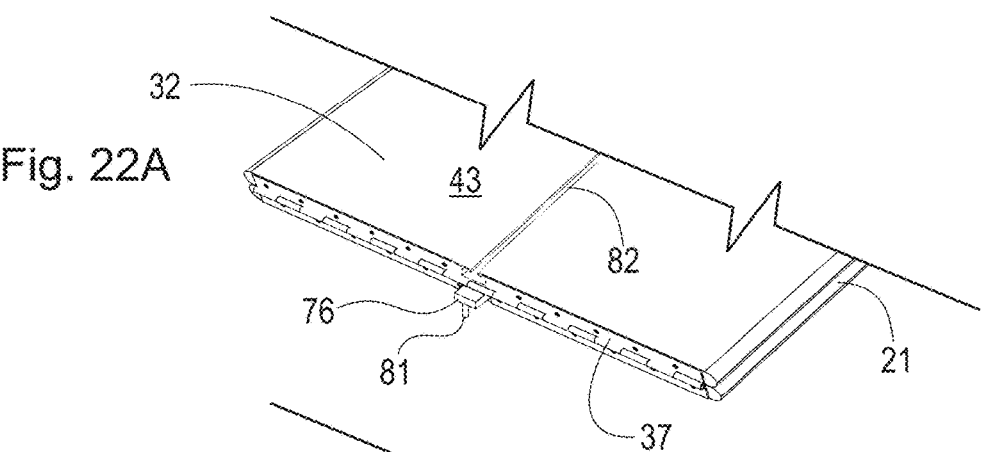
FIG. 22A is a fragmentary view showing a support strip extending outwardly from the center panel to support the left wing panel, showing the support strip partially extended from the center panel.
Figure 22B:
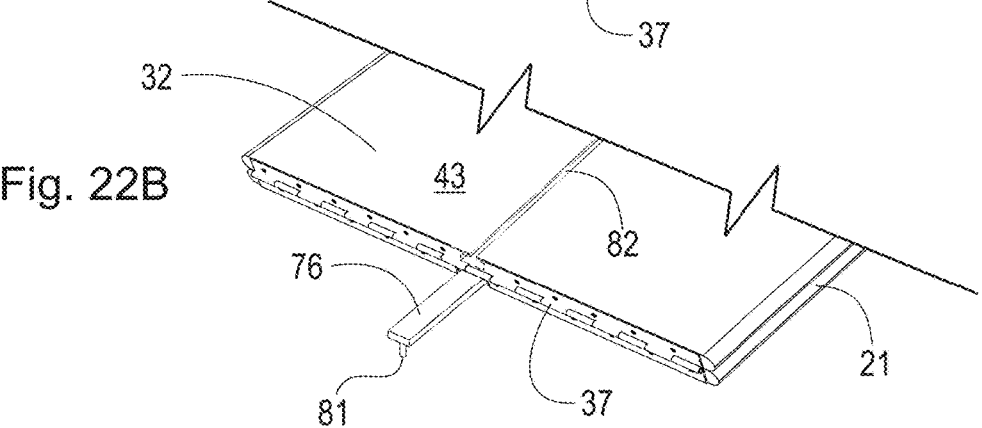
FIG. 22B is a view similar to that of FIG. 22A, but with the support strip extended even further.
Figure 22C:
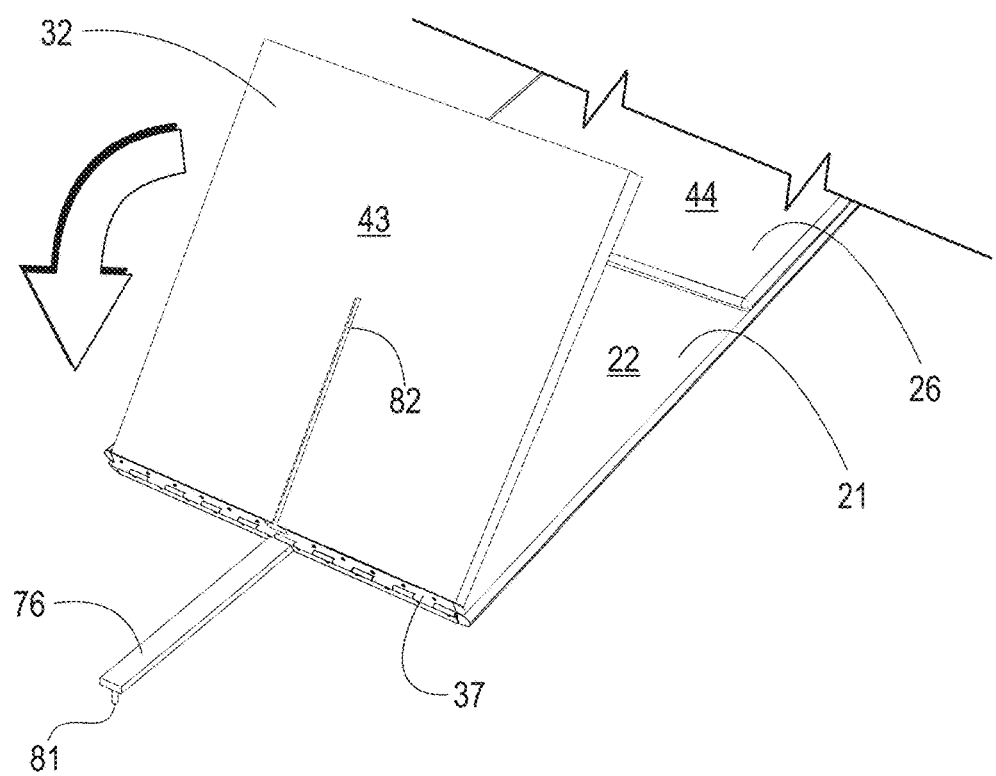
FIG. 22C is a view similar to that of FIG. 22B but showing the support strip fully extended.

FIGS. 22a-22c illustrate an alternative embodiment of table assembly 30 which further comprises a support strip 76 upon which to rest left wing panel 32 or the right wing panel 28 when the table is in the open configuration. Support strip 76 comprises a strip having a support surface, a support pin, and a draw tab. In FIG. 22a, support strip 76 is illustrated in a stored position underneath the extension table center panel 21. Support strip 76 may be secured to extension table center portion by guide brackets which allow for translational movement between stored and deployed configurations. Alternatively, support strip 76 may be secured to center panel 21 by placing it in a sheath and securing the sheet, or by housing it inside a cavity in the underside of center panel 21 wherein the strip is held in by a pair of flanges. A support anchor 84 may be utilized to prevent support strip 76 from over-extending and detaching from center panel 21.

As shown in FIG. 22b, support strip 76 may be deployed by pulling draw tab 79 away from the table center panel 21 to expose support surface 83. Over extension is prevented by the presence of support guide pin 81. Once deployed, left wing panel 32 or right wing panel 26 rests on support surface 83 of the support strip 76, as seen in FIG. 22c, to prevent over-rotation of the respective wing panels and provide added strength. In the preferred embodiment, support strip 76 further comprises a guide pin 81 oriented to engage with a guide groove 82.

Figure 23:
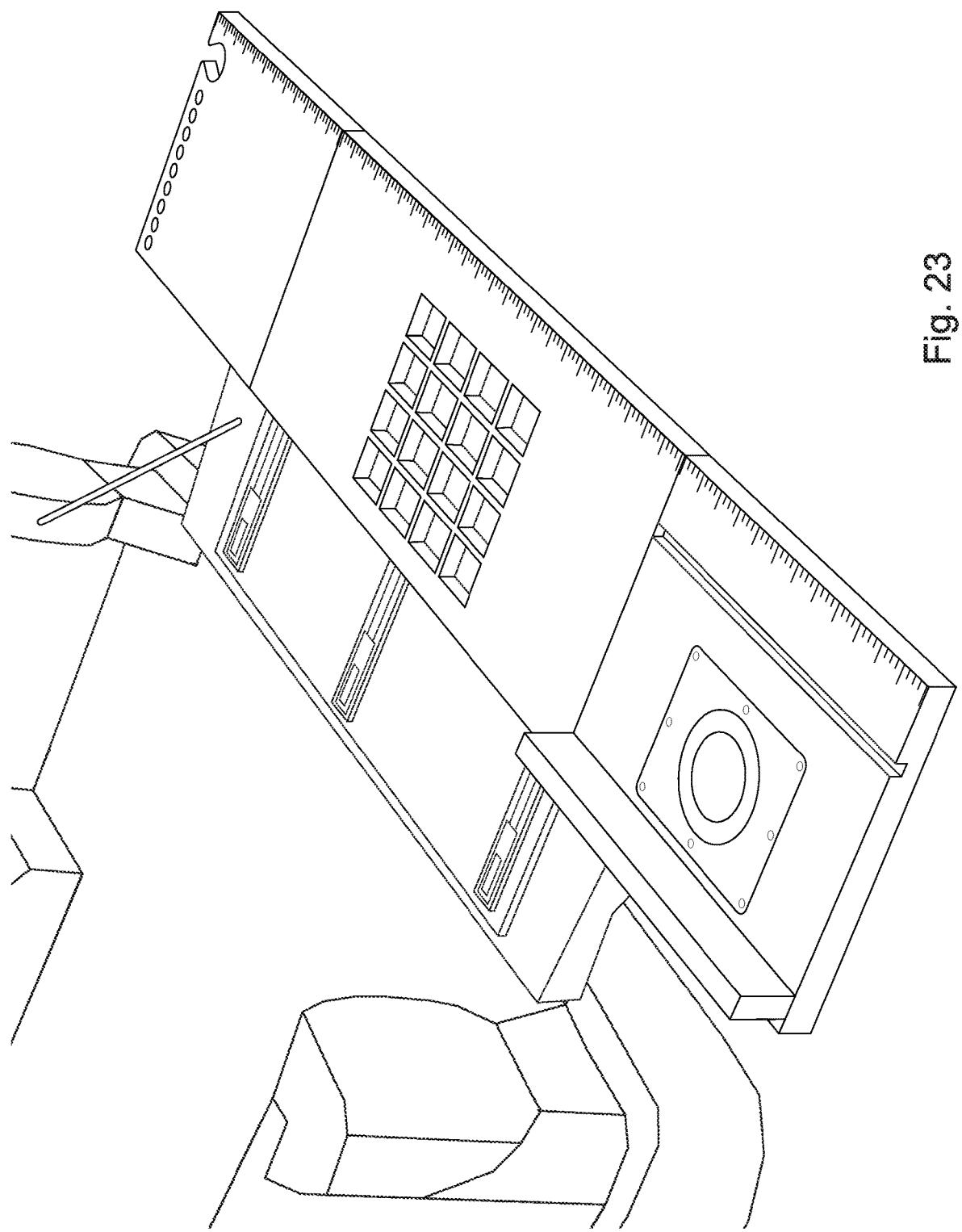
FIG. 23 is a perspective view of one embodiment of the table of the invention extended outwardly and rearwardly from the tailgate of a truck, illustrating one configuration of the center panel, and left and right wing panels.

FIG. 23 is a perspective view of one embodiment of the table of the invention extended outwardly and rearwardly from the tailgate of a truck, illustrating one configuration of the center panel, and left and right wing panels.

Figure 24:
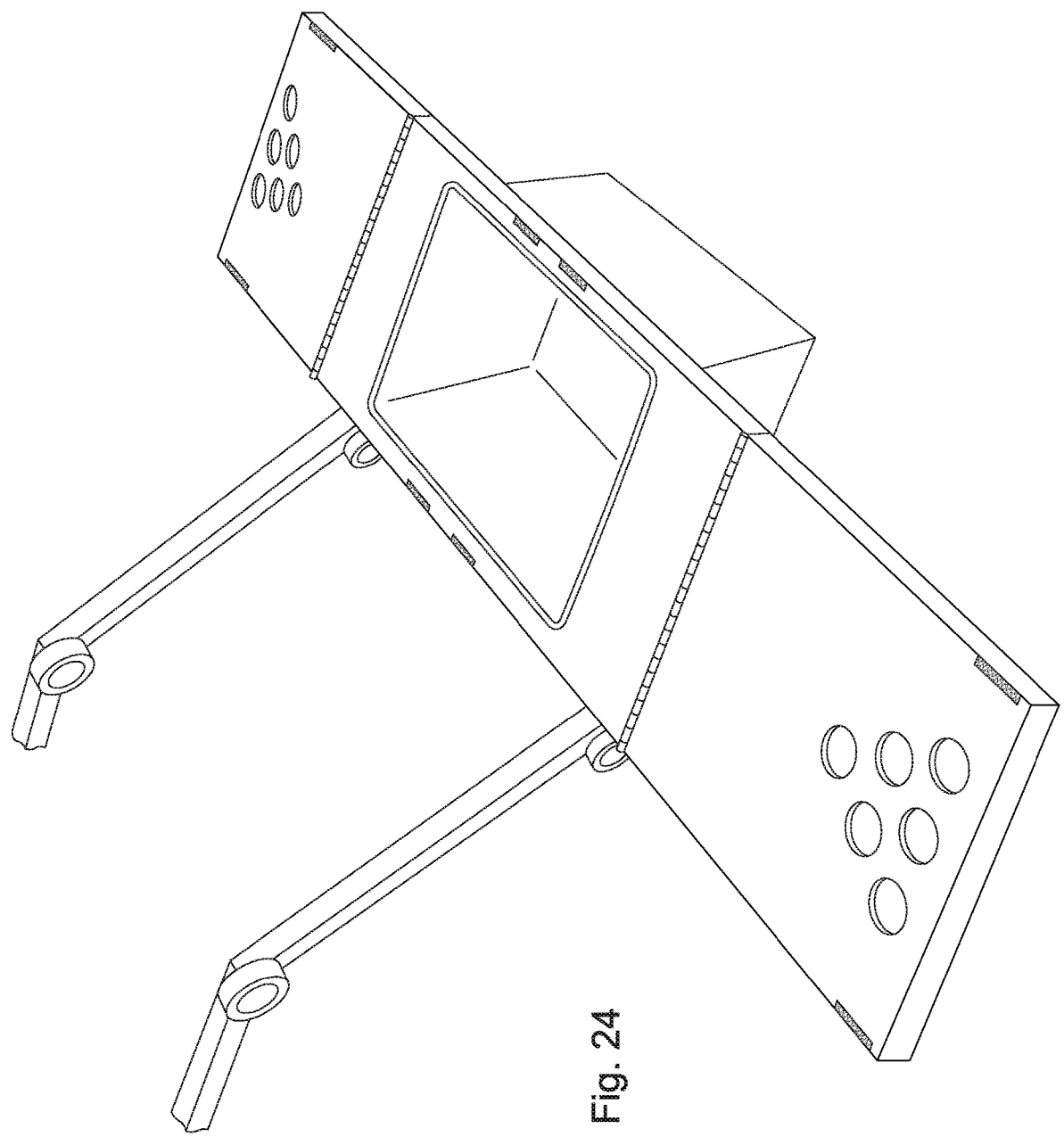
FIG. 24 is a perspective view of another embodiment of the table of the invention illustrating a cantilever, pivoting attachment means whereby the table may be secured to a vehicle such as a "lifted truck"

FIG. 24 is a perspective view of another embodiment of the table of the invention illustrating a cantilever, pivoting attachment means whereby the table may be secured to a vehicle such as a "lifted truck". This drawings shows a ruler gauge for measuring along one edge of the table, and also shows a router table mounting and guide in the left wing, a flat table surface in the right wings, and a grated compartment for holding hardware, tools, and the like in the center panel.

FIG. 24 is a perspective view of another embodiment of the table of the invention illustrating a cantilever, pivoting attachment means whereby the table may be secured to a vehicle such as a "lifted truck". This is an extendable, height-adjustable, multi-point hinge which includes a plurality of knobs for adjusting tension to allow the user to adjust the height of the table surface as well as the distance of the table from the tailgate of the vehicle.

Figure 25:
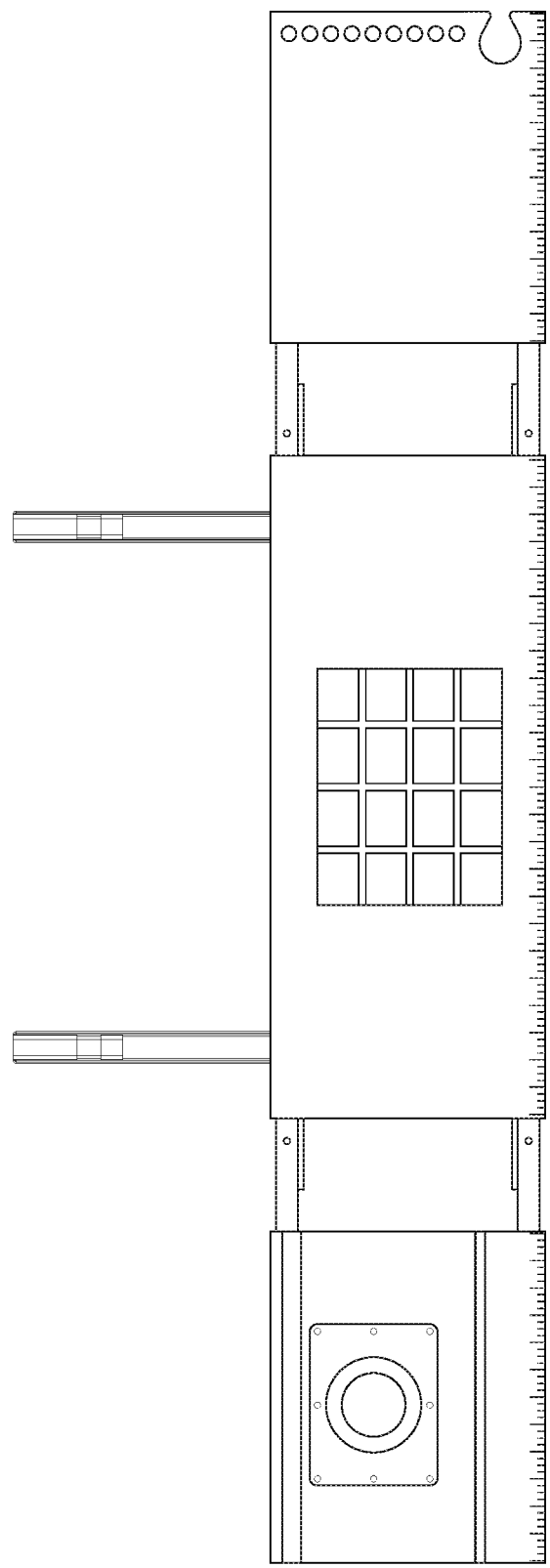
FIG. 25 is a top partially exploded view of the table shown in FIG. 23.

FIG. 25 is a top partially exploded view of the table shown in FIG. 23. This view shows how the left and right wing panels are arranged to slidingly engage rails extending outwardly from the center panel.

Figure 26:
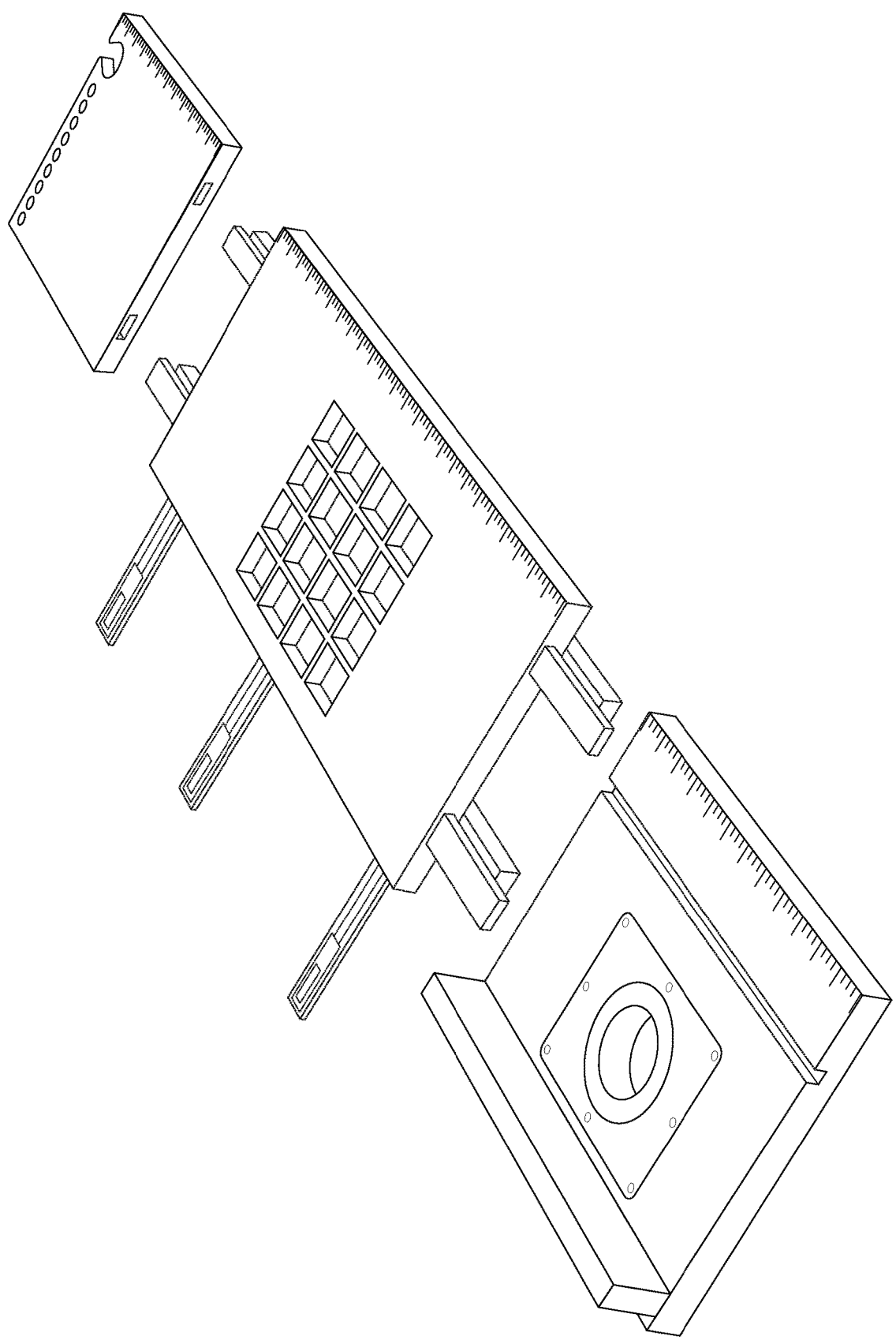
FIG. 26 is an exploded top view of the table shown in FIG. 24.

FIG. 26 is an exploded top view of the table shown in FIG. 24.

Figure 27:
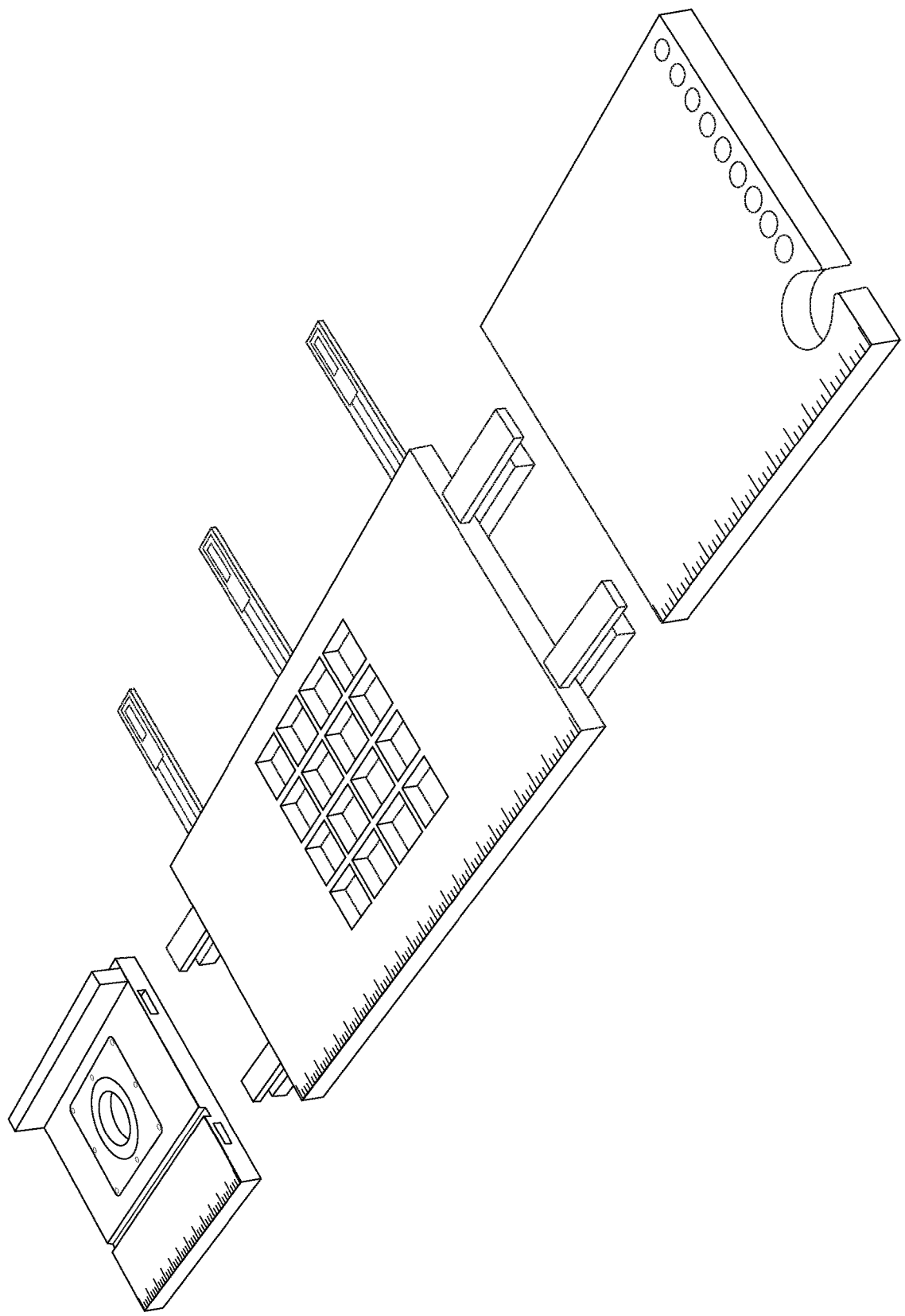
FIG. 27 is a view similar to that of FIG. 26 except with the left and right wings transposed; and, FIG. 28 is a perspective view of another embodiment of the invention, illustrating a table arranged for playing of a popular "beer pong" game.

FIG. 27 is a view similar to that of FIG. 26 except with the left and right wings transposed.

Figure 28:
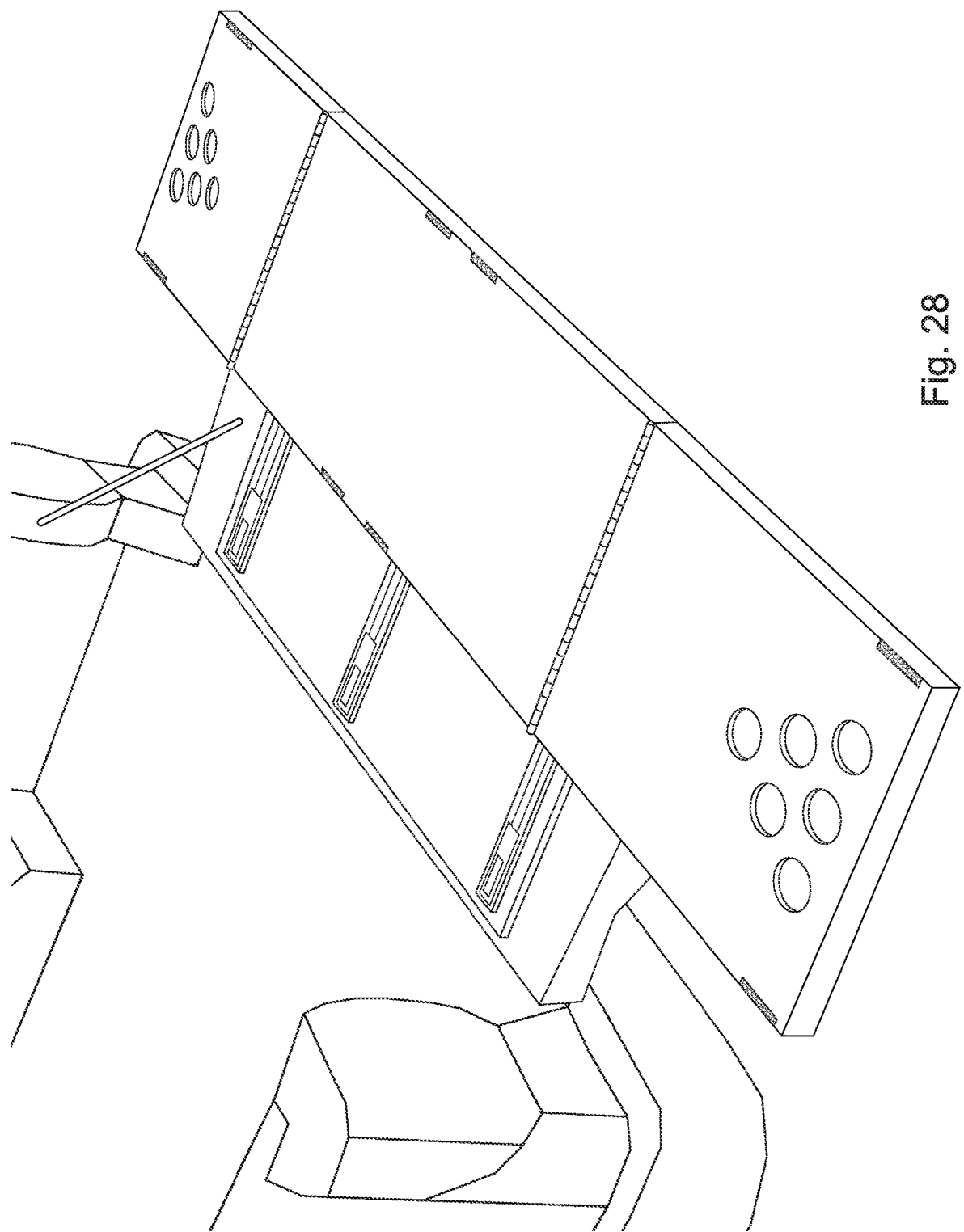

FIG. 28 is a perspective view of another embodiment of the invention, illustrating a table arranged for playing of a popular "beer pong" game.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMBERS 10 vehicle
11 truck bed
12 support cables
13 securing screws or bolts
14 apertures
14a tailgate apertures
14b base member apertures
15 tailgate
16a, 16b, 16c sliding mechanisms
17a, 17b, 17c nested sliding portions
18a, 18b, 18c sliding portions
19a, 19b, 19c guides
20 extension table
21 center panel
22 top surface of center panel
23 bottom surface of center panel
24 right edge of center panel
25 left edge of center panel
26 right wing panel
27 right wing hinge
28 top surface of right wing panel
29 proximal end of right wing panel
30 table assembly
31 distal end of right wing panel
32 left wing panel
33 top surface of left wing panel
34 proximal end of left wing panel
35 distal end of left wing panel
36 base member
37 left wing hinge
38 top surface of base member
39 bottom surface of base member
41 proximal draw latch fastener
41a proximal draw latch draw arm
41b proximal draw latch hooking bracket
42 distal draw latch fastener
42a distal draw latch draw arm
42b distal draw latch hooking bracket
43 left wing panel bottom surface
44 right wing panel bottom surface
45 sliding body
46 sliding rails
48 stopper
49 dampener
49 resistive component
50 pull latch fastener apparatus
51 guide flat surface
52 guide rails
53 housing cavity
54 intermediate sliding portion
55 rollers
56 nested sliding channels
58 hook base
59 pull latch
60 hook and loop fastener apparatus
61 metal hook
62 fastening loop
63 fastening loop bracket
64 pin fastener
65 hook tape
66 loop tape
68 hook latch base
69 pivot hook
70 pivot hook latch apparatus
71 pivot hook latch
72 magnet
73 ferromagnetic plate
74 securing strap
75 snap
75a snap head
75b nipple
76 support strip 78 support strip housing
79 support strip pull tab
80 magnetic fastener assembly
81 support strip guide pin
82 support strip guide grove
83 support surface
84 support strip anchor
90 strap and snap fastener assembly

What is claimed is:

1. A table for use with a vehicle tailgate, comprising:
   a base member having a top surface and a bottom surface wherein the bottom surface of the base member is operatively arranged to be removably secured to the tailgate of a vehicle;
   a sliding mechanism having a sliding portion and a guide, wherein the guide is fixedly secured to the top surface of the base member;
   a center panel having a top surface, a bottom surface, a right edge, and a left edge, wherein the bottom surface of the center panel is fixedly secured to the sliding portion of the sliding mechanism and operatively arranged to allow for translational movement of the center panel relative to the base member;
   a right wing panel having a top surface, a proximal end, and a distal end, wherein the proximal end of the right wing is pivotably secured to the right edge of the center panel such that the top surface of the right wing is substantially parallel to and resting atop the top surface of the center panel when in a closed configuration and is exposed and substantially parallel to the top surface of the center panel when in an open configuration;
   a left wing panel having a top surface, a proximal end, and a distal end, wherein the proximal end of the left wing is pivotably secured to the left edge of the center panel such that the top surface of the left wing rests on the top surface of the center panel when in a closed configuration and is exposed and parallel to the top surface of the center panel when in an open configuration;
   a fastener to removably secure the right wing panel and the left wing panel against the top surface of the center panel when in the closed configuration; and,
   at least one support member is operatively arranged to be extendably attached under each of the right and left edges of the center panel bottom surface to provide supportive contact with the right and left wing panels.

2. The table recited in claim 1 wherein said vehicle is a pickup truck.

3. The table recited in claim 1 wherein said fastener is selected from the group consisting of hook-and-loop, a magnet, a pull latch, and a draw fastener.

4. The table recited in claim 1 wherein the center panel, right wing panel, and left wing panel are composed of a material selected from the group consisting of a rigid polymer, metal, wood, and composite materials.

5. The table recited in claim 4 wherein the rigid polymer is poly vinyl polyvinyl chloride.

6. The table recited in claim 4 wherein the metal is an alloy.

7. The table recited in claim 1 where in wherein the sliding mechanism is lockable.

\* \* \* \* \*

UNITED STATES PATENT AND TRADEMARK OFFICE
CERTIFICATE OF CORRECTION

| | |
|---|---|
| PATENT NO. | : 10,889,223 B2 |
| APPLICATION NO. | : 16/199026 |
| DATED | : January 12, 2021 |
| INVENTOR(S) | : Pascarella |

Page 1 of 1

It is certified that error appears in the above-identified patent and that said Letters Patent is hereby corrected as shown below:

In the Claims

Column 12, Claim 5, Lines 24-25, should read as follows: --The table recited in Claim 4 wherein the rigid polymer is polyvinyl chloride.--

Column 12, Claim 7, Lines 29-30, should read as follows: --The table recited in Claim 1 wherein the sliding mechanism is lockable.--

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*